(12) United States Patent
Maybury, Jr.

(10) Patent No.: US 9,260,048 B2
(45) Date of Patent: *Feb. 16, 2016

(54) COLLECTION TANK

(71) Applicant: McLaughlin Group, Inc., Greenville, SC (US)

(72) Inventor: Charles Robert Maybury, Jr., Shippensburg, PA (US)

(73) Assignee: MCLAUGHLIN GROUP, INC., Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/266,159

(22) Filed: Apr. 30, 2014

(65) Prior Publication Data

US 2014/0239624 A1    Aug. 28, 2014

Related U.S. Application Data

(63) Continuation of application No. 13/751,987, filed on Jan. 28, 2013, now Pat. No. 8,925,753, which is a continuation of application No. 12/979,114, filed on Dec. 27, 2010, now Pat. No. 8,360,260, which is a continuation of application No. 12/855,478, filed on Aug. 12, 2010, now abandoned, which is a continuation of application No. 11/544,428, filed on Oct. 6, 2006, now Pat. No. 7,837,050.

(51) Int. Cl.
| | |
|---|---|
| *B65D 55/00* | (2006.01) |
| *E05F 15/02* | (2006.01) |
| *E05F 15/10* | (2006.01) |
| *B60P 3/22* | (2006.01) |
| *E02F 3/88* | (2006.01) |
| *E02F 3/92* | (2006.01) |
| *E02F 5/00* | (2006.01) |

(Continued)

(52) U.S. Cl.
CPC ............... *B60P 3/2245* (2013.01); *B60P 3/22* (2013.01); *B65D 45/28* (2013.01); *E02F 3/8816* (2013.01); *E02F 3/8891* (2013.01); *E02F 3/925* (2013.01); *E02F 5/003* (2013.01); *E02F 7/00* (2013.01); *Y10T 137/6855* (2015.04)

(58) Field of Classification Search
CPC ......... B65D 45/28; B65D 55/14; E05F 15/02; E05F 15/10
See application file for complete search history.

(56) References Cited

U.S. PATENT DOCUMENTS

| | | |
|---|---|---|
| 2,122,517 A | 7/1938 | Curtis |
| 2,144,586 A | 1/1939 | Kelley |

(Continued)

OTHER PUBLICATIONS

Reimann & Georger Corp.—Web Site Brochure for Hydra Core Drill dated Jan. 25, 2005.

(Continued)

*Primary Examiner* — Anthony Stashick
*Assistant Examiner* — Jennifer N Zettl
(74) *Attorney, Agent, or Firm* — Nelson Mullins Riley & Scarborough, LLP

(57) ABSTRACT

A collection tank for use in a vacuum operated earth reduction system, the collection tank comprising a closed first end, an open second end defining a tank sealing flange and a body extending between the closed first end and the open second end. An internal chamber defined by the body, the closed first end and the open second end has a door coupled to the open second end and is configured to releasably seal the open second end. An automated door closer is coupled to a center of the door, wherein the automated door closer provides a closing force at the center of the door so that the closing force is equally distributed about a periphery of the door to seal the door against the tank sealing flange.

21 Claims, 21 Drawing Sheets

(51) Int. Cl.
*B65D 45/28* (2006.01)
*E02F 7/00* (2006.01)

(56) References Cited

U.S. PATENT DOCUMENTS

| | | | | |
|---|---|---|---|---|
| 2,250,670 | A | | 7/1941 | Joy |
| 2,448,546 | A | * | 9/1948 | Plemel et al. ............ 128/202.16 |
| 2,480,692 | A | * | 8/1949 | Anthony .................... 244/129.4 |
| 2,507,522 | A | * | 5/1950 | Heine ............................. 366/55 |
| 2,562,551 | A | * | 7/1951 | Henderson ................... 220/262 |
| 2,639,601 | A | * | 5/1953 | Miller ............................ 68/139 |
| 3,540,618 | A | * | 11/1970 | Lildal .......................... 220/211 |
| 3,713,472 | A | * | 1/1973 | Dozois ......................... 160/189 |
| 3,768,203 | A | * | 10/1973 | Bellucci ........................ 49/254 |
| 3,888,528 | A | * | 6/1975 | Jericijo ..................... 292/256.5 |
| 3,968,845 | A | * | 7/1976 | Chaffin .......................... 175/60 |
| 4,119,238 | A | * | 10/1978 | Ali Ja'afar et al. ........... 220/211 |
| 4,155,586 | A | | 5/1979 | Flynn |
| 4,307,541 | A | * | 12/1981 | Farmer et al. .................. 49/280 |
| 4,322,868 | A | * | 4/1982 | Wurster ......................... 15/302 |
| 4,334,633 | A | * | 6/1982 | Piegza .......................... 49/199 |
| 4,434,861 | A | * | 3/1984 | Howeth ......................... 175/66 |
| 4,510,714 | A | * | 4/1985 | Kasper et al. .................. 49/249 |
| 4,518,095 | A | * | 5/1985 | Engwert ....................... 220/260 |
| 4,655,362 | A | * | 4/1987 | Ecker et al. .................. 220/260 |
| 4,669,628 | A | * | 6/1987 | Hatta ........................... 220/211 |
| 4,842,223 | A | * | 6/1989 | Allton et al. ................. 244/158.1 |
| 4,936,031 | A | * | 6/1990 | Briggs et al. ................... 37/347 |
| 5,016,717 | A | * | 5/1991 | Simons et al. .................. 175/66 |
| 5,021,156 | A | | 6/1991 | Sloan |
| 5,092,963 | A | * | 3/1992 | Barker et al. ................. 202/250 |
| 5,140,759 | A | | 8/1992 | Artzberger |
| 5,141,528 | A | * | 8/1992 | Boczkiewicz et al. .......... 95/291 |
| 5,191,993 | A | * | 3/1993 | Wanger et al. ................ 220/211 |
| 5,287,602 | A | * | 2/1994 | Dykstra ......................... 24/463 |
| 5,295,317 | A | * | 3/1994 | Perrott .......................... 37/348 |
| 5,299,370 | A | * | 4/1994 | Gyori et al. ..................... 37/347 |
| 5,408,766 | A | | 4/1995 | Pobihushchy |
| 5,500,976 | A | * | 3/1996 | Rohrbacher et al. ............ 15/320 |
| 5,515,625 | A | | 5/1996 | Keigley |
| 5,791,073 | A | | 8/1998 | Palmer et al. |
| 5,860,232 | A | * | 1/1999 | Nathenson et al. ............. 37/466 |
| 6,000,151 | A | | 12/1999 | Hayes |
| D423,521 | S | | 4/2000 | Walter et al. |
| 6,202,330 | B1 | * | 3/2001 | Bolton ........................... 37/403 |
| 6,273,512 | B1 | * | 8/2001 | Rajewski ....................... 299/17 |
| 6,360,458 | B2 | | 3/2002 | Dolister |
| 6,386,598 | B1 | * | 5/2002 | Dykstra et al. ................ 292/113 |
| 6,397,967 | B1 | | 6/2002 | McIlwraith |
| 6,470,605 | B1 | * | 10/2002 | Gilman et al. .................. 37/323 |
| 6,499,934 | B1 | * | 12/2002 | Kaczmarski et al. ......... 414/723 |
| 6,517,292 | B1 | | 2/2003 | Landau |
| 6,550,406 | B2 | | 4/2003 | Bass et al. |
| 6,604,304 | B1 | * | 8/2003 | Slabach et al. .................. 37/304 |
| 6,615,849 | B1 | * | 9/2003 | Gilman et al. ............. 134/22.18 |
| 6,988,568 | B2 | | 1/2006 | Buckner |
| 7,234,252 | B2 | | 6/2007 | Jarnecke et al. |
| 7,415,748 | B1 | | 8/2008 | Guhr et al. |
| 7,484,322 | B2 | | 2/2009 | Maybury, Jr. et al. |
| 7,484,332 | B2 | * | 2/2009 | Hormann et al. ............... 49/322 |
| 7,503,134 | B2 | | 3/2009 | Buckner |
| 7,523,570 | B2 | | 4/2009 | Pobihushchy |
| 7,644,523 | B2 | | 1/2010 | Buckner |
| 7,743,537 | B2 | | 6/2010 | Maybury, Jr. |
| 7,837,050 | B2 | | 11/2010 | Maybury, Jr. |
| 8,066,140 | B1 | * | 11/2011 | Young et al. .................. 220/263 |
| 8,127,959 | B2 | * | 3/2012 | Gloor et al. ................... 220/211 |
| 8,336,231 | B2 | | 12/2012 | Maybury, Jr. et al. |
| 8,360,260 | B2 | | 1/2013 | Maybury, Jr. |
| 8,667,717 | B2 | | 3/2014 | Maybury, Jr. et al. |
| 9,057,180 | B1 | | 6/2015 | Sewell |
| 2004/0108317 | A1 | * | 6/2004 | Buckner ....................... 220/263 |
| 2005/0210623 | A1 | | 9/2005 | Buckner |
| 2006/0032095 | A1 | * | 2/2006 | Buckner ......................... 37/304 |
| 2006/0086010 | A1 | | 4/2006 | Jarnecke et al. |
| 2006/0117612 | A1 | * | 6/2006 | Maybury et al. ................ 37/304 |
| 2006/0118338 | A1 | * | 6/2006 | Maybury ...................... 175/213 |
| 2006/0182591 | A1 | * | 8/2006 | Hackett et al. ................ 414/685 |
| 2007/0261309 | A1 | * | 11/2007 | Tommell et al. ................ 49/339 |
| 2008/0066383 | A1 | * | 3/2008 | Decker et al. ................... 49/339 |
| 2008/0083143 | A1 | * | 4/2008 | Maybury ........................ 37/317 |
| 2008/0085163 | A1 | * | 4/2008 | Maybury ...................... 406/152 |
| 2008/0244859 | A1 | * | 10/2008 | Maybury ..................... 15/340.2 |
| 2009/0133296 | A1 | | 5/2009 | Maybury, Jr. et al. |
| 2010/0320204 | A1 | | 12/2010 | Maybury, Jr. |
| 2011/0107548 | A1 | | 5/2011 | Maybury, Jr. |
| 2011/0258890 | A1 | | 10/2011 | Maybury, Jr. et al. |
| 2012/0317882 | A1 | * | 12/2012 | Zazula ........................... 49/339 |
| 2013/0062893 | A1 | * | 3/2013 | Mclaughlin et al. ....... 292/256.6 |
| 2013/0111786 | A1 | | 5/2013 | Maybury, Jr. et al. |
| 2013/0134163 | A1 | | 5/2013 | Maybury, Jr. |

OTHER PUBLICATIONS

RockVac Brochure.
SerVac Brochure.
Response to Office Action dated Oct. 12, 2006, from corresponding U.S. Appl. No. 10/971,455.
Final Office Action dated Apr. 2, 2007, from corresponding U.S. Appl. No. 10/971,455.
Response to Final Office Action dated Apr. 2, 2007, from corresponding U.S. Appl. No. 10/971,455.
Office Action dated Jul. 11, 2007, from corresponding U.S. Appl. No. 10/971,455.
Response to Office Action dated Jul. 11, 2007, from corresponding U.S. Appl. No. 10/971,455.
Final Office Action dated Jan. 14, 2008, from corresponding U.S. Appl. No. 10/971,455.
Response to Final Office Action dated Jan. 14, 2008, from corresponding U.S. Appl. No. 10/971,455.
Advisory Action dated Jul. 11, 2008, from corresponding U.S. Appl. No. 10/971,455.
Notice of Allowance, including Examiner's Amendment dated Sep. 26, 2008, from corresponding U.S. Appl. No. 10/971,455.
Office Action dated May 12, 2010, from corresponding U.S. Appl. No. 12/361,242 (now abandoned).
Response to Office Action dated May 12, 2010, from corresponding U.S. Appl. No. 12/361,242 (now abandoned).
Final Office Action, dated Jan. 5, 2011, from corresponding U.S. Appl. No. 12/361,242 (now abandoned).
Office Action, dated Sep. 28, 2011, from corresponding U.S. Appl. No. 13/175,510.
Response to Office Action, dated Sep. 28, 2011, from corresponding U.S. Appl. No. 13/175,510.
Office Action, dated May 7, 2013, from corresponding U.S. Appl. No. 13/724,559.
Response to Office Action, dated May 17, 2013, from corresponding U.S. Appl. No. 13/724,559.
Office Action, dated Jun. 27, 2013, from corresponding U.S. Appl. No. 13/751,987.
Response to Office Action, dated Jun. 27, 2013, from corresponding U.S. Appl. No. 13/751,987.
Final Office Action, dated Oct. 1, 2013, from corresponding U.S. Appl. No. 13/751,987.
Response to Final Office Action, dated Oct. 1, 2013, from corresponding U.S. Appl. No. 13/751,987.
Response to Office Action, dated Mar. 4, 2015, for corresponding U.S. Appl. No. 14/266,354.
Response to Office Action, dated Mar. 16, 2015, for corresponding U.S. Appl. No. 14/266,439.
Office Action, dated Mar. 4, 2015, for corresponding U.S. Appl. No. 14/266,354.
Office Action, dated Mar. 6, 2015, for corresponding U.S. Appl. No. 14/266,439.
Office Action, dated Jul. 15, 2015, from U.S. Appl. No. 14/200,532.

* cited by examiner

COLLECTION TANK

CLAIM OF PRIORITY

This application is a continuation of U.S. application Ser. No. 13/751,987, filed Jan. 28, 2013, which is a continuation of U.S. application Ser. No. 12/979,114, filed Dec. 27, 2010 (now U.S. Pat. No. 8,360,260), which is a continuation of U.S. application Ser. No. 12/855,478, filed Aug. 12, 2010 (now abandoned), which is a continuation of U.S. application Ser. No. 11/544,428, filed Oct. 6, 2006 (now U.S. Pat. No. 7,837,050), the entire disclosure of each of which is incorporated by reference herein.

FIELD OF THE INVENTION

This invention relates generally to a reduction system for removing soil to expose underground utilities (such as electrical and cable services, water and sewage services, etc.), and more particularly to an improved vacuum tank for use with such system.

BACKGROUND OF THE INVENTION

With the increased use of underground utilities, it has become more critical to locate and verify the placement of buried utilities before installation of additional underground utilities or before other excavation or digging work is performed. Conventional digging and excavation methods such as shovels, post hole diggers, powered excavators, and backhoes may be limited in their use in locating buried utilities as they may tend to cut, break, or otherwise damage the lines during use.

Devices have been previously developed to create holes in the ground to non-destructively expose underground utilities to view. One design uses high pressure air delivered through a tool to loosen soil and a vacuum system to vacuum away the dirt after it is loosened to form a hole. Another system uses high pressure water delivered by a tool to soften the soil and create a soil/water slurry mixture. The tool is connected with a vacuum system for vacuuming the slurry away into a collection tank. The tank may then be emptied by opening a door on the tank.

Prior art vacuum systems are provided with a tank having a manually closing door that is locked in a closed position by latches, locks or other suitable locking mechanisms. Such devices rely on an operator to apply the proper amount of force to ensure that a tight vacuum seal is created between an outer periphery of the door and the edge of the tank. However, if the locking force is applied at two opposing edges of the door or to a single point around the periphery of the door, then the closing force is greatest at the point where the door is locked closed. In an example where the locking points are positioned at 9 o'clock and 3 o'clock on the door, the greatest closing force occurs at 9 and 3 o'clock with the least closing force occurring at 12 and 6 o'clock. That is, as you move away from the locking points, the closing force on the periphery of the door begins to decrease. While a vacuum seal may be created, it cannot always be guaranteed especially if the door is warped.

SUMMARY OF THE INVENTION

The present invention recognizes and addresses disadvantages of prior art constructions and methods, and it is an object of the present invention to provide a collection tank for use in a vacuum operated earth reduction system, the collection tank comprising a closed first end, an open second end defining a tank sealing flange and a body extending between the closed first end and the open second end. An internal chamber defined by the body, the closed first end and the open second end has a door coupled to the open second end and is configured to releasably seal the open second end. An automated door closer is coupled to a center of the door, wherein the automated door closer provides a closing force at the center of the door so that the closing force is equally distributed about a periphery of the door to seal the door against the tank sealing flange.

In other embodiments, the automated door closer further comprises at least one hydraulic cylinder having a piston rod in driving engagement with one of said first and second linkage assemblies, said at least one hydraulic cylinder being configured to move said door between said open first position and said closed second position.

In yet another embodiment, a collection tank for use in a vacuum operated earth reduction system comprises a closed first end, an open second end defining a tank sealing flange and a body extending between the closed first end and the open second end. A door is moveably coupled to the tank open second end and defines a sealing flange about a periphery thereof. The door is configured to releasably seal the tank open second end. An automated door closer has a cross bar rigidly attached to a center of the door, the cross bar having a first end and a second end. A first linkage assembly having a first end is threadedly coupled to the cross bar first end and a second end is coupled to the body. A second linkage assembly having a first end is threadedly coupled to the cross bar second end and a second end is coupled to the body. The threaded connection between the first linkage assembly first end and the cross bar first end and the threaded connection between the second linkage assembly first end and the cross bar second end may be adjusted to change a closing force applied to the center of the door.

In other embodiments, the door may have a generally circular-shaped door panel having an outer circumference. Additionally, the generally circular-shaped door panel may be dome-shaped. In yet other embodiments, the door is biased into the closed second position. An in some embodiments, the automated door closer may be remotely actuated.

BRIEF DESCRIPTION OF THE DRAWINGS

A full and enabling disclosure of the present invention, including the best mode thereof directed to one of ordinary skill in the art, is set forth in the specification, which makes reference to the appended figures, in which.

Figure 1:
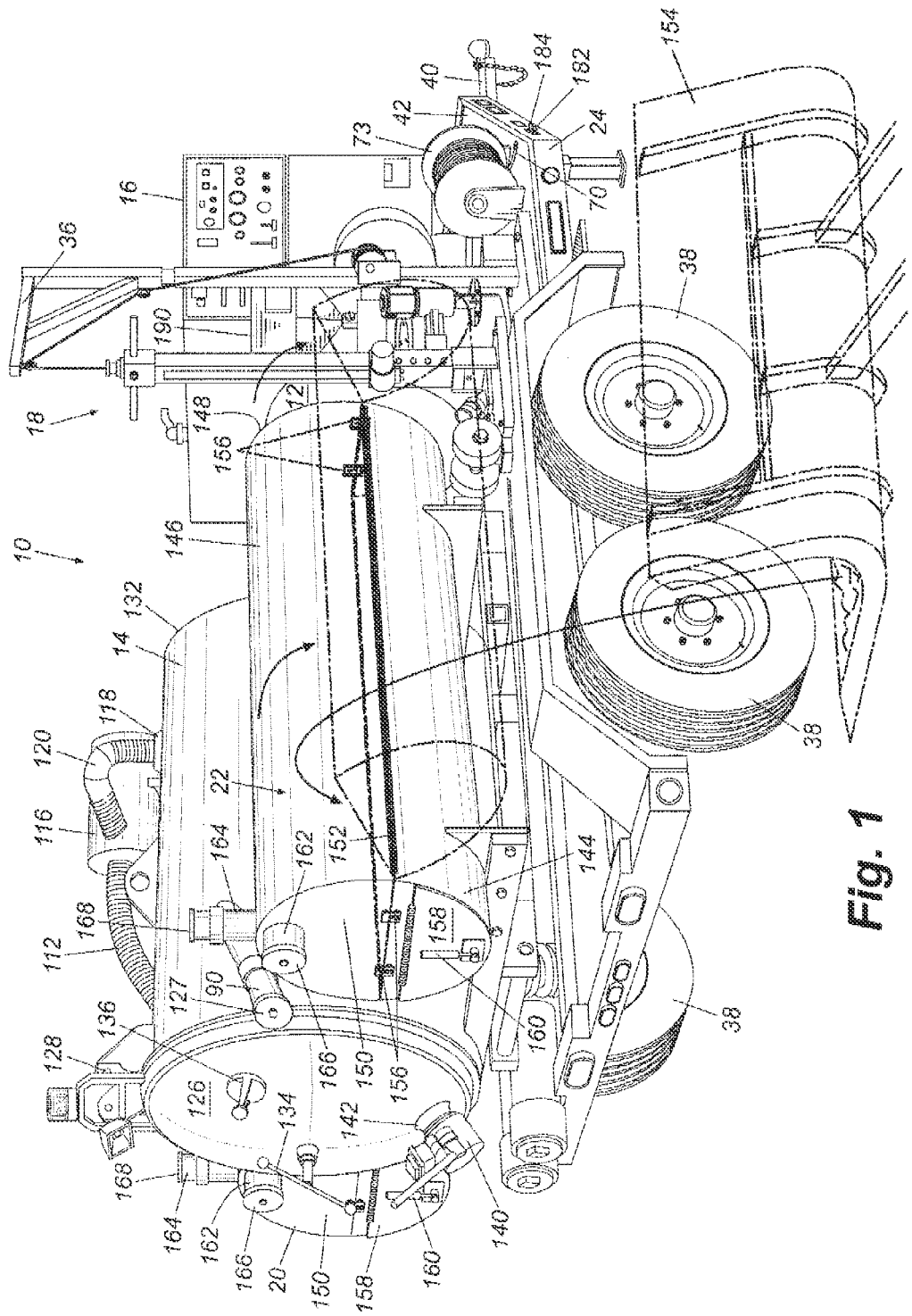
FIG. 1 is a perspective view of a prior art vacuum and backfill system.

Repeat use of reference characters in the present specification and drawings is intended to represent same or analogous features or elements of the invention.

DETAILED DESCRIPTION

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring to FIG. 1, a drilling and backfill system 10 generally includes a water reservoir tank 12, a collection tank 14, a motor 16, a drilling apparatus 18, and back fill reservoirs 20 and 22, all mounted on a mobile chassis 24, which is, in this embodiment, in the form of a trailer. Trailer 24 includes four wheels 38 (only three of which are shown in FIG. 1) and a draw bar and hitch 40. Drilling and backfill system 10 generally mounts on a platform 42, which is part of trailer 24. It should be understood that while drill and backfill system 10 is illustrated mounted on a trailer having a platform, the system may also be mounted on the chassis of a vehicle such as a truck or car. Further, a chassis may comprise any frame, platform or bed to which the system components may be mounted and that can be moved by a motorized vehicle such as a car, truck, or skid steer. It should be understood that the components of the system may be either directly mounted to the chassis or indirectly mounted to the chassis through connections with other system components.

Figure 21:
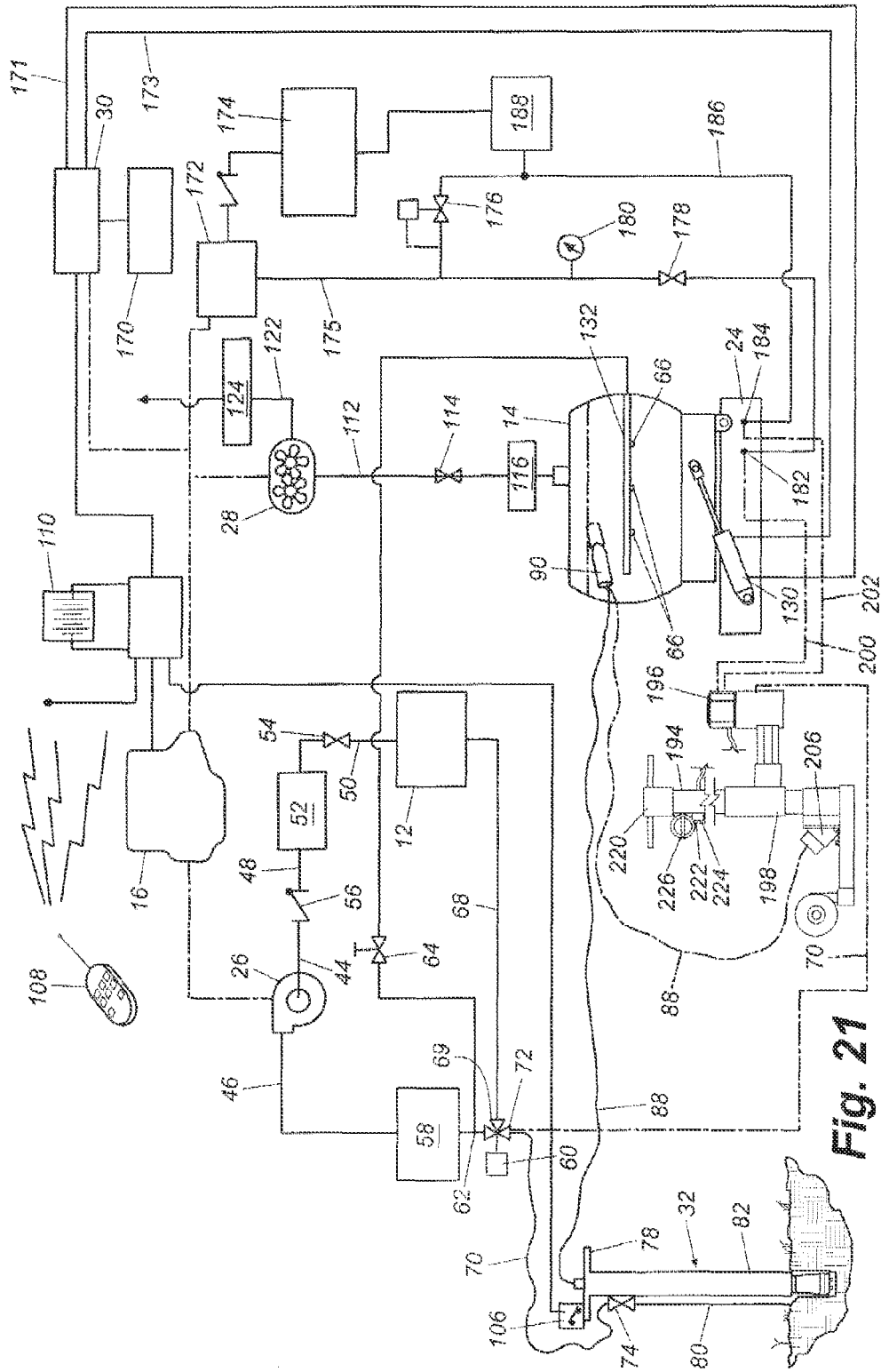
FIG. 21 is a schematic view of the hydraulic, electric, water, and vacuum systems of the drilling and backfill system of FIG. 1.

The connection of the various components of system 10 is best illustrated in FIG. 21. Referring also to FIG. 1, motor 16 is mounted on a forward end of trailer 24, provides electricity to power two electric hydraulic pumps 30 and 172 (FIG. 21), and drives both a water pump 26 (FIG. 21) and a vacuum pump 28 (FIG. 21) by belts (not shown). Motor 16 is preferably a gas or diesel engine, although it should be understood that an electric motor or other motive means could also be used. In one preferred embodiment, motor 16 is a thirty horsepower diesel engine, such as Model No. V1505 manufactured by Kubota Engine division of Japan, or a twenty-five horsepower gasoline engine such as Model Command PRO CH25S manufactured by Kohler Engines. The speed of motor 16 may be varied between high and low by a wireless keypad transmitter 108 that transmits motor speed control to a receiver 110 connected to the throttle of motor 16.

The water system will now be described with reference to FIG. 21. Water reservoir tank 12 connects to water pump 26, which includes a low pressure inlet 44 and a high pressure outlet 46. In the illustrated embodiment, water pump 26 can be any of a variety of suitable pumps that delivers between 3,000 and 4,000 lbs/in$^2$ at a flow rate of approximately five gallons per minute. In one preferred embodiment, water pump 26 is a Model No. TS2021 pump manufactured by General Pump. Water tank 12 includes an outlet 50 that connects to a strainer 52 through a valve 54. The output of strainer 52 connects to the low pressure side of water pump 26 via a hose 48. A check valve 56 is placed inline intermediate strainer 52 and low pressure inlet 44. High pressure outlet 46 connects to a filter 58 and then to a pressure relief and bypass valve 60. In one preferred embodiment, pressure relief and bypass valve 60 is a Model YUZ140 valve manufactured by General Pump.

Figure 3:
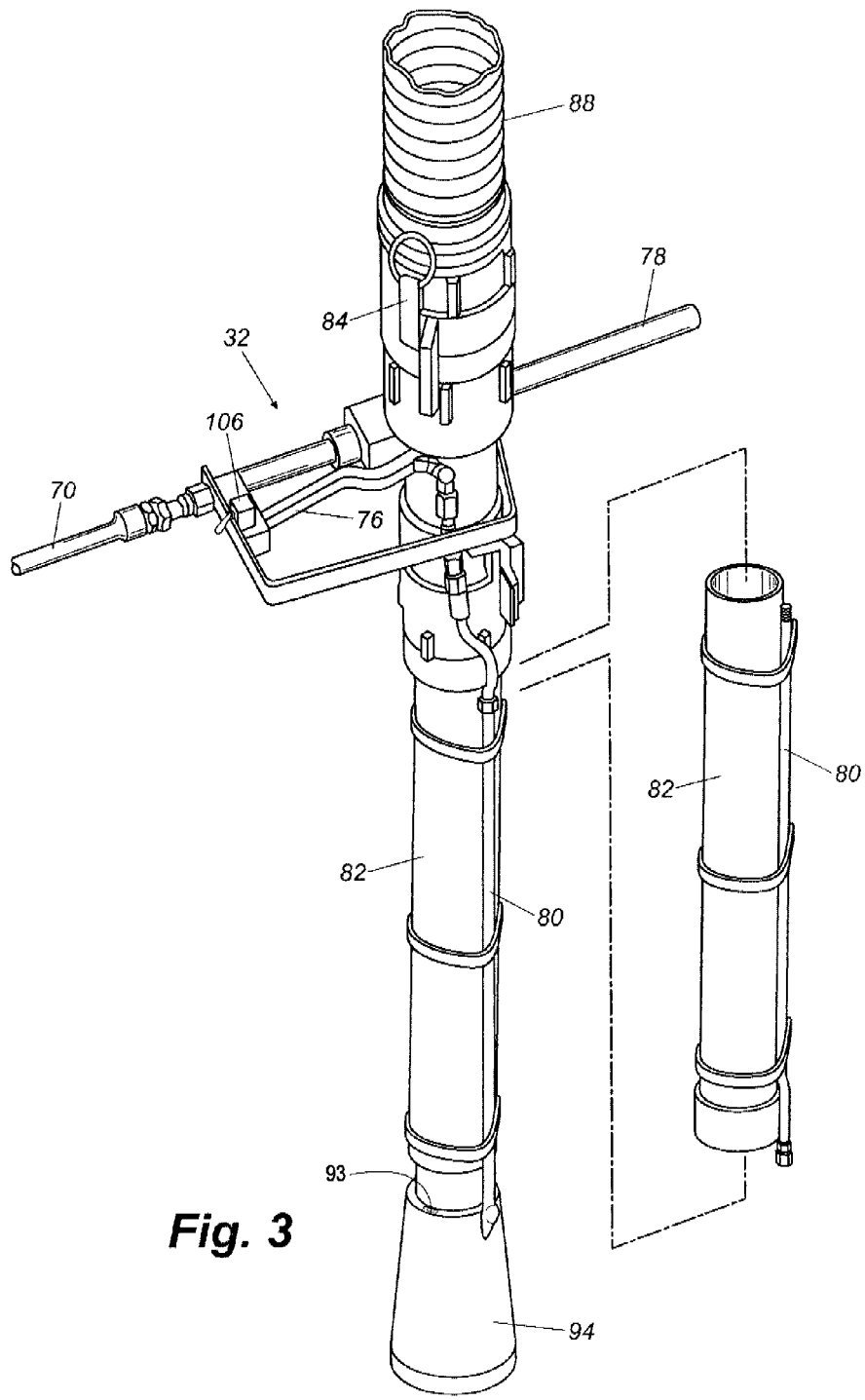
FIG. 3 is a perspective view of an earth reduction tool in accordance with an embodiment of the present invention.

A "T" 62 and a valve 64, located intermediate valve 60 and filter 58, connect the high pressure output 46 to a plurality of clean out nozzles 66 mounted in collection tank 14 to clean the tank's interior. A return line 68 connects a low pressure port 69 of valve 60 to water tank 12. When a predetermined water pressure is exceeded in valve 60, water is diverted through low port 69 and line 68 to tank 12. A hose 70, stored on a hose reel 73 (FIG. 1), connects an output port 72 of valve 60 to a valve 74 on a digging tool 32 (FIG. 3). A valve control 76 (FIG. 3) at a handle 78 of digging tool 32 provides the operator with a means to selectively actuate valve 74 on digging tool 32. The valve delivers a high pressure stream of water through a conduit 80 (FIGS. 3, 5, 7, and 21) attached to the exterior of an elongated pipe 82 that extends the length of digging tool 32.

Figure 7:
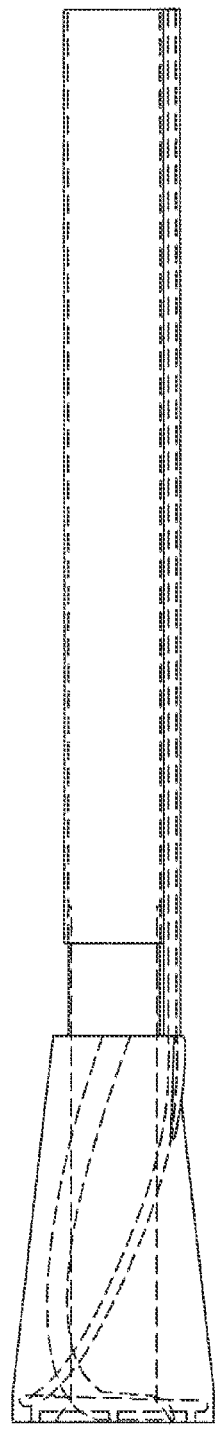
FIG. 7 is a side plan view of the earth reduction tool of FIG. 3.
Figure 8:
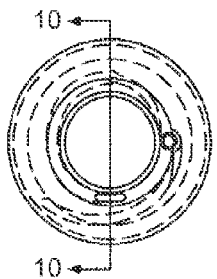
FIG. 8 is a top plan view of the earth reduction tool of FIG. 3.
Figure 9:
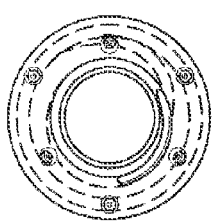
FIG. 9 is a bottom plan view of the earth reduction tool of FIG. 3.
Figure 10:
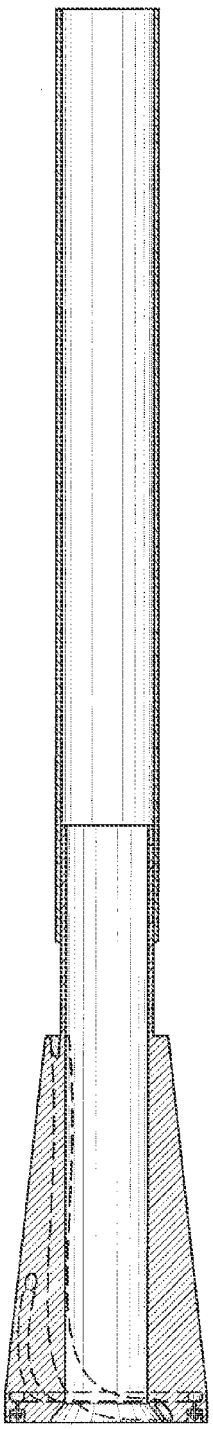
FIG. 10 is a side section view of the earth reduction tool of FIG. 8 taken along lines 10-10.
Figure 11:
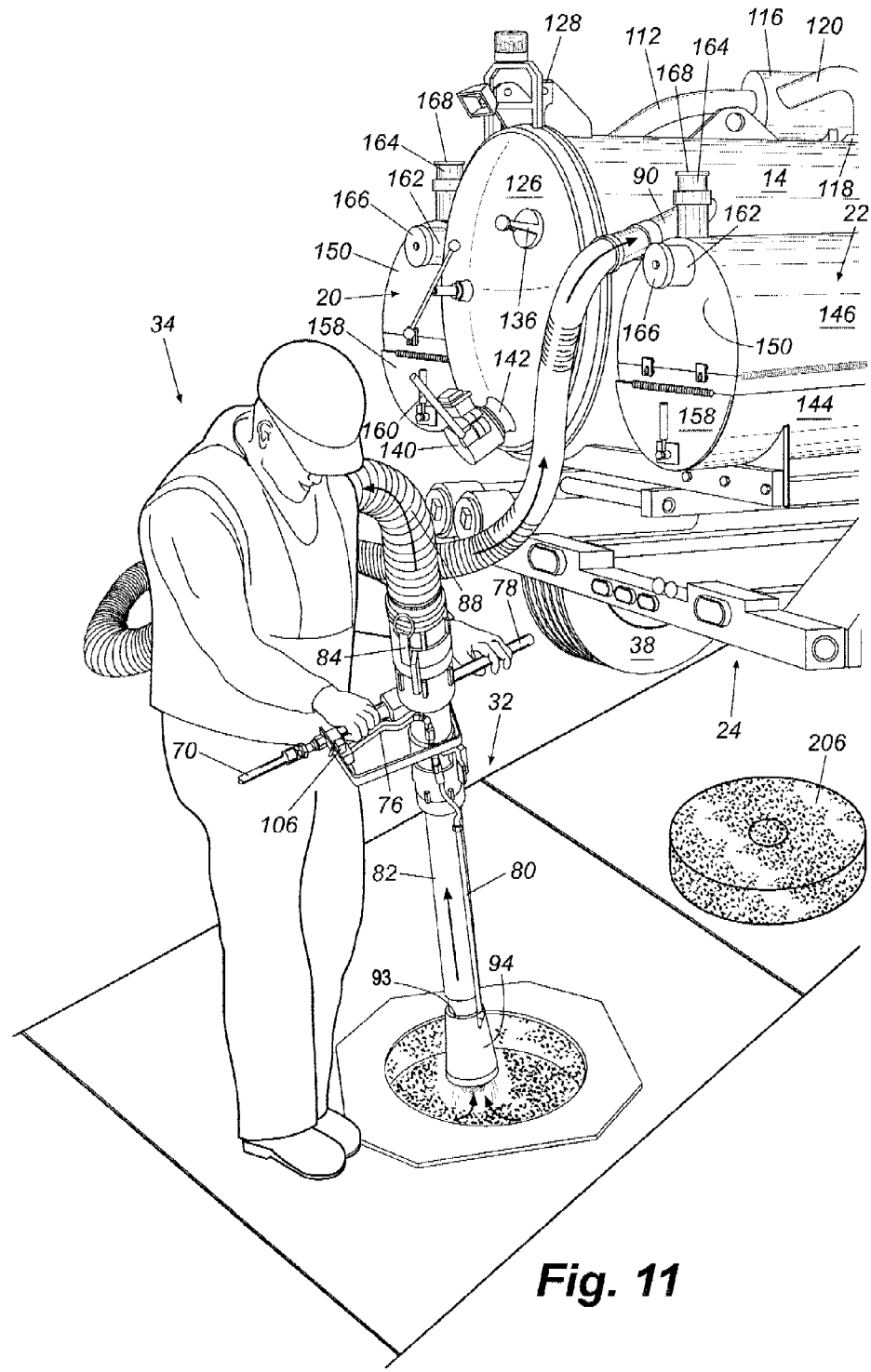
FIG. 11 is a perspective view of the reduction tool of FIG. 3 in use digging the hole.

Referring to FIG. 3, digging tool 32 includes handle 78 for an operator 34 (FIG. 11) to grasp during use of the tool, a head 93 and an elongated pipe 82 that connects the handle to the head. A connector 84, such as a "banjo" type connector located proximate to handle 78, connects the vacuum system on drilling and back fill system 10 (FIG. 1) to a central vacuum passage 86 (FIG. 4) in digging tool 32. It should be understood that other types of connectors may be used in place of "banjo" connector 84, for example clamps, clips, or threaded ends on hose 88 and handle 78. Referring to FIGS. 7 and 10, vacuum passage 86 extends the length of elongated pipe 82 and connects at an end (not shown) to one end of a vacuum hose 88 (FIG. 11). The other end of hose 88 connects to an inlet port 90 on collection tank 14 (FIG. 11). A second end 86*a* of vacuum passage 86 terminates at an opening 87 by a slanted shoulder 89.

Figure 4:
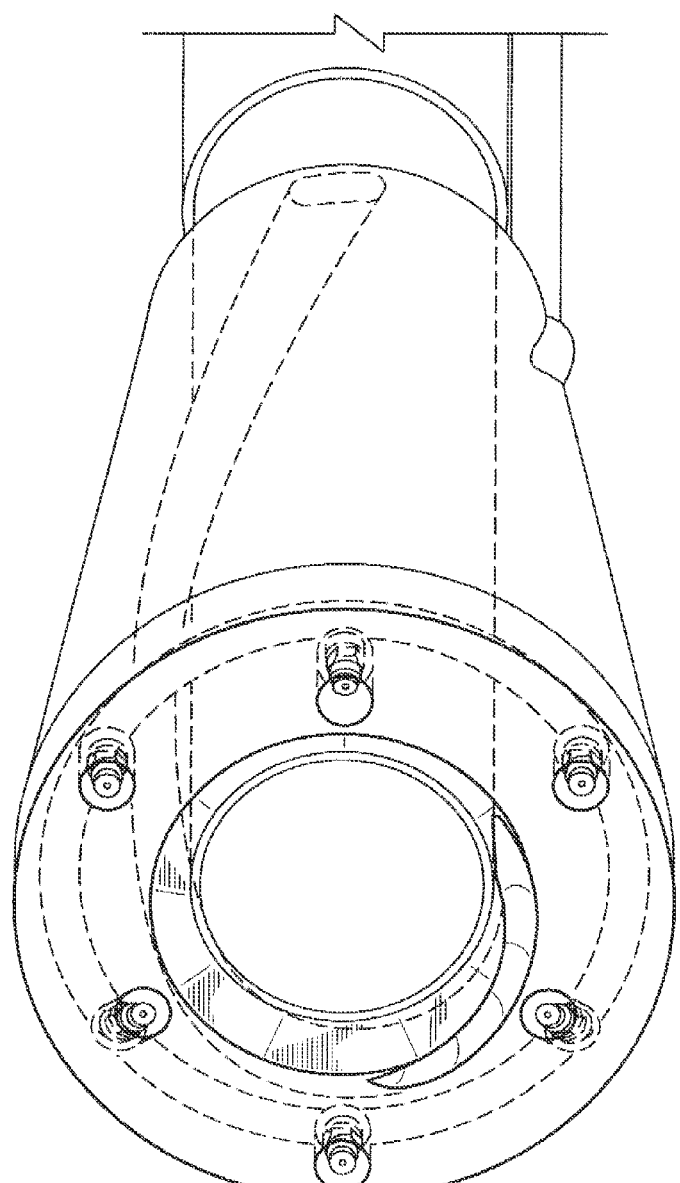
FIG. 4 is bottom perspective view of the earth reduction tool shown in FIG. 3.
Figure 5:
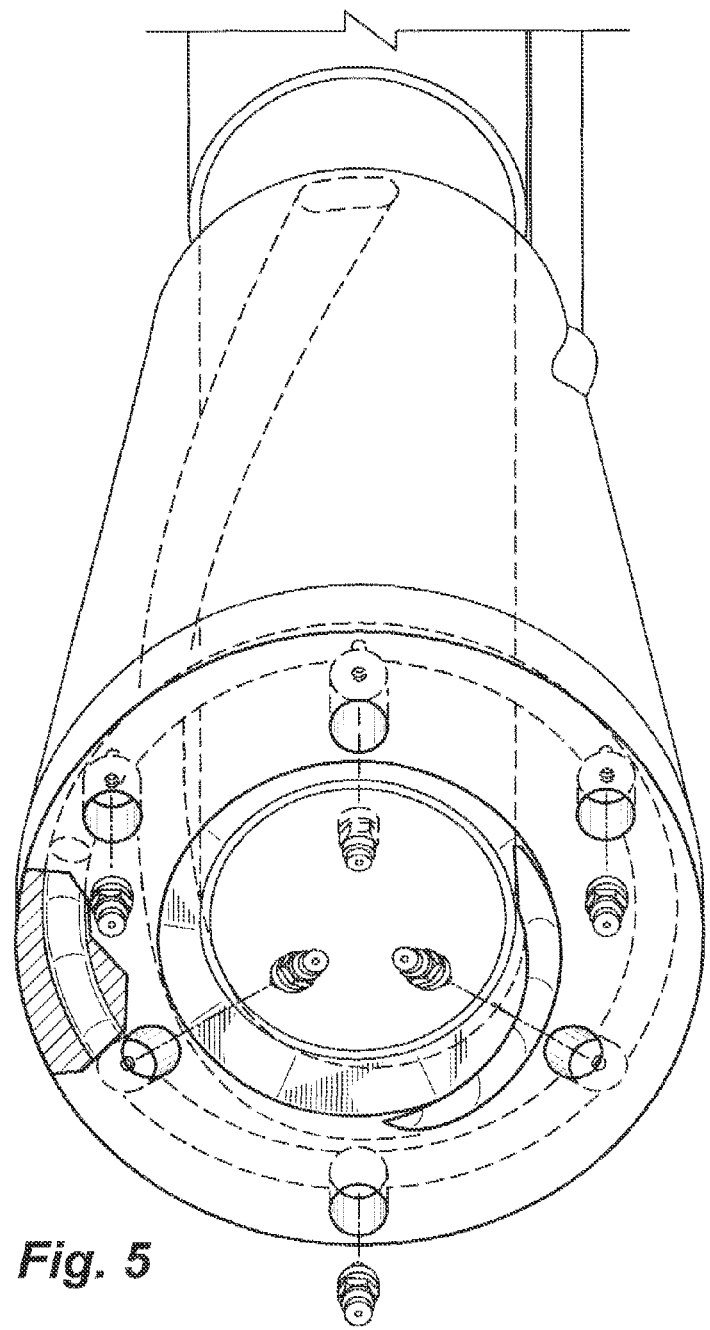
FIG. 5 is a partial exploded perspective view of the earth reduction tool of FIG. 4.
Figure 6:
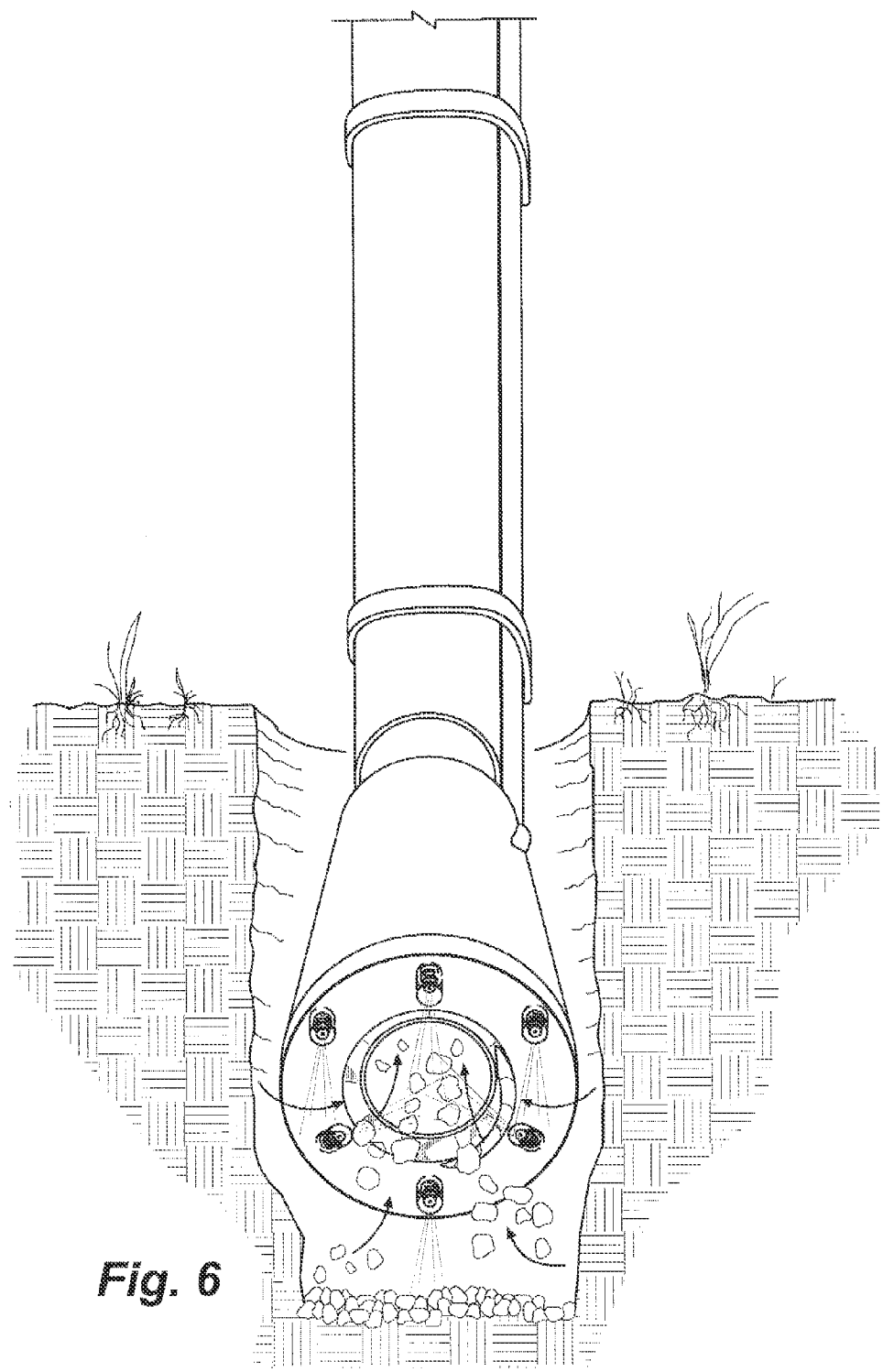
FIG. 6 is partial perspective view of the earth reduction tool of FIG. 3 in use digging a hole.

Referring to FIGS. 4 and 5, a fluid manifold 91, located at one side 92 of head 93, connects a water conduit 80 to a water feed line 94 (FIGS. 4 and 7) formed through head 93. In one embodiment, water feed line 94 is integrally formed in the head during casting of the head. However, it should be understood that the water feed line may also be added to the head after the head is cast. Head 93 contains two sets of a plurality of nozzles 95 and 96, the first set 95 being angled radially inwardly at approximately 45 degrees from a vertical axis of the digging tool, and the second set 96 being directed parallel to the axis of the digging tool. It should be understood that the angle of first set 95 may be adjusted depending on the application of the digging tool to almost any angle between 0 and 90 degrees to enhance the digging effect of the tool.

Each nozzle is set in a countersunk hole 102 formed in a bottom surface 97 of head 93 such that the end of each nozzle is recessed from bottom surface 97. In particular, if water feed line 94 is integrally cast within the head, a plurality of tap holes 103 (FIG. 5) are drilled into bottom surface 97 so that the holes tap into water feed line 94. Next, countersunk hole 102 is concentrically formed with tap hole 103, and the tap hole is threaded. The nozzles are then threadedly attached to the tap hole so that the nozzles are in fluid communication with the water feed line.

During use of drilling tool 32, nozzles 95 and 96 produce a spiral cutting action that breaks the soil up sufficiently to minimize clogging of large chunks of soil within vacuum passage 86 and/or vacuum hose 88. Vertically downward pointing nozzles 96 enhance the cutting action of the drilling tool by allowing for soil to be removed not only above a buried utility, but in certain cases from around the entire periphery of the utility. In other words, the soil is removed above the utility, from around the sides of the utility, and from beneath the utility. This can be useful for further verifying the precise utility needing service and, if necessary, making repairs to or tying into the utility.

Still referring to FIGS. 4 and 5, an air feed passage 98 is formed in head 93 and has a first opening 99 at head end 92 and a second opening 100 at a second end 101 of head 93. In one preferred embodiment, air feed passage 98 is integrally formed in head 93 when the head is cast. However, it should be understood that the air feed may also be formed from tubing extending from head end 93 to head end 101. In one preferred embodiment, second opening 100 is located at or tangential to bottom surface 97 and may be formed as a single opening or as multiple openings.

Traditional vacuum digging tools without an air intake can dig a vertical hole approximately 0-20 feet deep. When an air intake is included in a vacuum digging tool, the digging depth can be extended to a depth of 50 feet or more in the vertical direction. Traditional vacuum digging tools may include air slots located proximate to head end 101 that extend from an outside surface through the head to an inside surface proximate vacuum passage first end 86*a*. Therefore, when the tool is used to dig a hole, air is pulled from around the head proximate head end 101. As a result, when tool is used to remove wet viscous material or discrete material of large particulate size, the air slots are easily clogged, thereby reducing the efficiency and effectiveness of the digging tool. To overcome this disadvantage of prior art digging tools, air intake opening 99 is located distal from head end 101 to prevent clogging or blocking of the air intake. As a result, in the present invention, the vacuum pressure may be maintained at the optimum level regardless of the digging conditions, and the depth of a hole may be extended several times the normal depth.

In some embodiments, head 93 may be integrally formed with elongated pipe 82, and air feed passage first opening 99 may be located anywhere along the length of the elongated pipe, provided the air feed passage first opening is located at a position distal from head second end 101. Thus, it should be understood that head 93, whether separate from or integral with elongated pipe 82, is considered to be a part of the elongated pipe. For purposes of this discussion, distal from the head second end may refer to a position anywhere from several inches away from the head second end to a point proximate the elongated body first end. What should be understood by those of skill in the art is that air intake opening 99 should not be located at any point along head 93 or elongated pipe 82 that would be covered by the material to be removed by the digging tool. It should also be understood in that some embodiments, digging tool 32 may not come equipped with a water feed system.

Returning to FIG. 11, digging tool 32 may also include a control 106 for controlling the tool's vacuum feature. Control 106 may be an electrical switch, a vacuum or pneumatic switch, a wireless switch, or any other suitable control to adjust the vacuum action by allowing the vacuum to be shut off or otherwise modulated. An antifreeze system, generally 190 (FIGS. 1 and 2), may be provided to prevent freezing of the water pump and the water system. Thus, when the pump is to be left unused in cold weather, water pump 26 may draw antifreeze from the antifreeze reservoir through the components of the water system to prevent water in the hoses from freezing and damaging the system.

Figure 17:
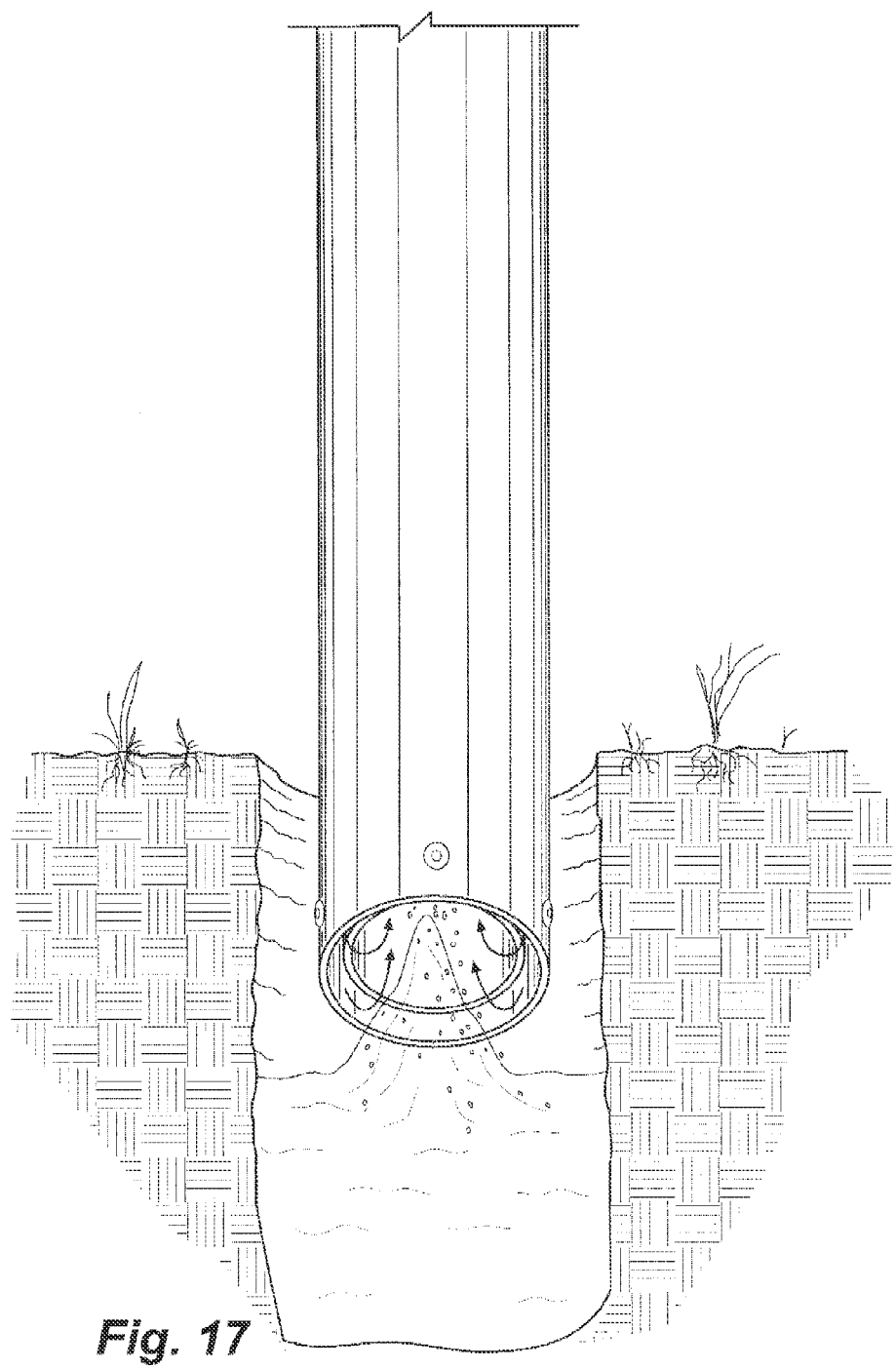
FIG. 17 is side plan view of the earth reduction tool of FIGS. 11 and 12 in use digging a hole.

Referring to FIGS. 12-18, another embodiment of a digging tool 310 has an elongated cylindrical body 312 with a first end 314 and an opposite second end 316. First end 314 is larger in diameter than pipe second end 316 such that the pipe first end is configured to receive the second end of another pipe section (as shown in FIG. 17) to extend the overall length of the digging tool. In this configuration, the length of elongated pipe 312 can be extended by the use of extender pipes 312*a* (FIG. 17) similar to that in the previously described embodiment.

Referring particularly to FIGS. 13-16, elongated body 312 is formed from an inner pipe 318 and an outer pipe 320 spaced apart from the inner pipe by a gap 322 such that gap 322 generally extends between body first end 314 and body second end 316. A plurality of fasteners 324 are located at each end of elongated body 312 and are positioned to secure outer pipe 320 to inner pipe 318. A plurality of through holes 326 are formed through outer pipe first end 314 proximate to the end of the pipe. It should be understood by those skilled in the art that preferably one elongated pipe 312 would contain holes 326 and that the holes may be contained anywhere along the length of the pipe so long as the holes are distal from pipe end 316. That is, extension pipes 312*a* would not contain holes 326 since the holes function as an air inlet for air to be fed down the length of elongated pipe 312 through gap 322 to end 316. For purposes of this discussion, distal from head second end 316 may refer to a position anywhere from several inches away from the head second end to a point proximate the elongated body first end. What should be understood by those of skill in the art is that through holes 326 should not be located at any point along elongated cylindrical body 312 that would be covered by the material to be removed by the digging tool. A center cavity 328 (FIGS. 13 and 14) defined by inner pipe 318 forms a vacuum passageway that is in fluid communication with vacuum hose 88 (FIG. 12).

Similar to the previous embodiment, a water feed line (not shown) may be attached to the length of the elongated pipe that terminates in a fluid manifold (not shown). Nozzles (not shown), similar to that in the previous embodiment, may be in fluid communication with the water manifold for use in cutting and breaking up of the digging material. The water feed line may be formed integrally with the elongated pipe, or a separate feed line may be attached to the pipe using clamps, adhesive, fasteners, etc.

Referring to FIGS. 1 and 21, vacuum pump 28 is preferably a positive displacement type vacuum pump such as that used as a supercharger on diesel truck. In one preferred embodiment, vacuum pump 28 is a Model 4009-46R3 blower manufactured by Tuthill Corporation, Burr Ridge, Ill. A hose 112 connects an intake of the vacuum pump to a vacuum relief device 114, which may be any suitable vacuum valve, such as a Model 215V-H01AQE spring loaded valve manufactured by Kunkle Valve Division, Black Mountain, N.C. Vacuum relief device 114 controls the maximum negative pressure of the vacuum pulled by pump 28, which is in the range of between 10 and 15 inches of Mercury (Hg) in the illustrated embodiment. A filter 116 (FIG. 1), located upstream of pressure relief valve 114, filters the vacuum air stream before it passes through vacuum pump 28. In one preferred embodiment, the filter media may be a paper filter such as those FleetGuard filters manufactured by Cummings Filtration. Filter 116 connects to an exhaust outlet 118 of collection tank 14 by a hose 120, as shown in FIGS. 1, 11, 12 and 21. An exhaust side 122 of vacuum pump 28 connects to a silencer 124, such as a Model TS30TR Cowl silencer manufactured by PHILLIPS & TEMRO INDUSTRIES of Canada. The output of silencer 124 exits into the atmosphere.

The vacuum air stream pulled through vacuum pump 28 produces a vacuum in collection tank 14 that draws a vacuum air stream through collection tank inlet 90. When inlet 90 is not closed off by a plug 127 (FIG. 1), the inlet may be connected to hose 88 (FIGS. 11 and 12) leading to digging tools 32 or 312. Thus, the vacuum air stream at inlet 90 is ultimately pulled through vacuum passages 86 or 328 at distal ends 94 or 312 of tool 32 or 312, respectively. Because it is undesirable to draw dirt or other particulate matter through the vacuum pump, a baffle system, for example as described in U.S. Pat. No. 6,470,605 (the entire disclosure which is incorporated herein), is provided within collection tank 14 to separate the slurry mixture from the vacuum air stream. Dirt, rocks, and other debris in the air flow hit a baffle (not shown) and fall to the bottom portion of the collection tank. The vacuum air stream, after contacting the baffle, continues upwardly and exits through outlet 118 through filter 116 and on to vacuum pump 28.

Figure 19:
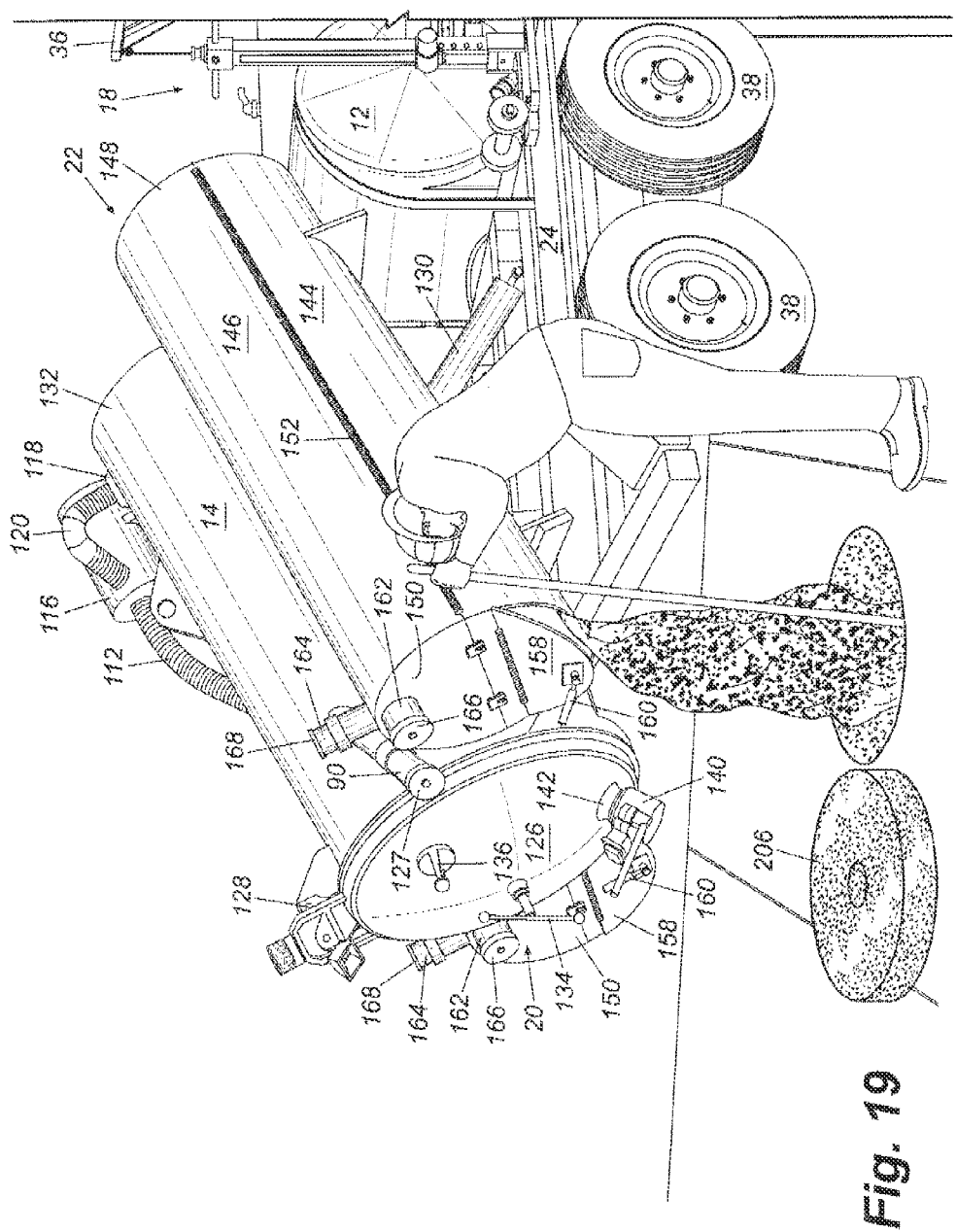
FIG. 19 is a perspective view of the drilling and backfill system of FIG. 1, showing the hole being backfilled.

Referring again to FIG. 1, collection tank 14 includes a discharge door 126 connected to the main tank body by a hinge 128 that allows the door to swing open, thereby providing access to the tank's interior for cleaning. A pair of hydraulic cylinders 130 (only one of which is shown in FIG. 19) are provided for tilting a forward end 132 of tank 14 upwards in order to cause the contents to run towards discharge door 126. A gate valve 140, coupled to a drain 142 in discharge door 126, drains the liquid portion of the slurry in tank 14 without requiring the door to be opened. Gate valve 140 may also be used to introduce air into collection tank 14 to reduce the vacuum in the tank so that the door may be opened.

Running the length of the interior of collection tank 14 is a nozzle tube 132 (FIG. 21) that includes nozzles 66 for directing high pressure water about the tank, and particularly towards the base of the tank. Nozzles 66 are actuated by opening valve 64 (FIG. 21), which delivers high pressure water from pump 26 to nozzles 66 for producing a vigorous cleaning action in the tank. When nozzles 66 are not being used for cleaning, a small amount of water is allowed to continuously drip through the nozzles to pressurize them so as to prevent dirt and slurry from entering and clogging the nozzles.

Nozzle tube 132, apart from being a conduit for delivering water, is also a structural member that includes a threaded male portion (not shown) on an end thereof adjacent discharge door 126. When discharge door 126 is shut, a screw-down type handle 134 mounted in the door is turned causing a threaded female portion (not shown) on tube 132 to mate with the male portion. This configuration causes the door to be pulled tightly against a sealing flange (not shown) of the collection tank. Actuation of vacuum pump 28 further assists the sealing of the door against the tank opening. Discharge door 126 includes a sight glass 136 to allow the user to visually inspect the tank's interior.

Referring again to FIG. 1, backfill reservoirs 20 and 22 are mounted on opposite sides of collection tank 14. The back fill reservoirs are mirror images of each other; therefore, for purposes of the following discussion, reference will only be made to backfill reservoir 22. It should be understood that backfill reservoir 20 operates identically to that of reservoir 22. Similar components on backfill reservoir 20 are labeled with the same reference numerals as those on reservoir 22.

Back fill reservoir 22 is generally cylindrical in shape and has a bottom portion 144, a top portion 146, a back wall 148, and a front wall 150. Top portion 146 connects to bottom portion 144 by a hinge 152. Hinge 152 allows backfill reservoir 22 to be opened and loaded with dirt by a front loader 154, as shown in phantom in FIG. 1. Top portion 146 secures to bottom portion 144 by a plurality of locking mechanisms 156 located on the front and back walls. Locking mechanisms 156 may be clasps, latches or other suitable devices that secure the top portion to the bottom portion. The seam between the top and bottom portion does not necessarily need to be a vacuum tight seal, but the seal should prevent backfill and large amounts of air from leaking from or into the reservoir. Front wall 150 has a hinged door 158 that is secured close by a latch 160. As illustrated in FIG. 19, hydraulic cylinders 130 enable the back fill reservoirs to tilt so that dirt can be off loaded through doors 158.

As previously described above, backfill reservoirs 20 and 22 may be filled by opening top portions 146 of the reservoirs and depositing dirt into bottom portion 144 with a front loader. Vacuum pump 28, however, may also load dirt into back fill reservoirs 20 and 22. In particular, back fill reservoir 22 has an inlet port 162 and an outlet port 164. During normal operation, plugs 166 and 168 fit on respective ports 162 and 164 to prevent backfill from leaking from the reservoir. However, these plugs may be removed, and outlet port 164 may be connected to inlet port 90 on collection tank 14 by a hose (not shown), while hose 88 may be attached to inlet port 162. In this configuration, vacuum pump 28 pulls a vacuum air stream through collection tank 14, as described above, through the hose connecting inlet port 90 to outlet port 164, and through hose 88 connected to inlet port 162. Thus, backfill dirt and rocks can be vacuumed into reservoirs 20 and 22 without the aide of loader 154. It should be understood that this configuration is beneficial when backfill system 10 is being used in an area where no loader is available to fill the reservoirs. Once the reservoirs are filled, the hoses are removed from the ports, and plugs 166 and 168 are reinstalled on respective ports 162 and 164.

Referring once more to FIG. 21, hydraulic cylinders 130, used to tilt collection tank 14 and backfill reservoirs 20 and 22, are powered by electric hydraulic pump 30. Hydraulic pump 30 connects to a hydraulic reservoir 170 and is driven by the electrical system of motor 16. A high pressure output line 171 and a return line 173 connect pump 30 to hydraulic cylinders 130. Hydraulic pump 172, mounted on trailer 24, is separately driven by motor 16 and includes its own hydraulic reservoir 174. An output high pressure line 175 and a return line 186 connect pump 172 to a pair of quick disconnect couplings 182 and 184, respectively. That is, high pressure line 175 connects to quick disconnect coupling 182 (FIGS. 1 and 2) through a control valve 178, and return line 186 connects quick disconnect coupling 184 to reservoir 188. A pressure relief valve 176 connects high pressure line 175 to reservoir 188 and allows fluid to bleed off of the high pressure line if the pressure exceeds a predetermined level. A pressure gauge 180 may also be located between pump 172 and control valve 178.

Quick disconnect coupling 182 provides a high pressure source of hydraulic fluid for powering auxiliary tools, such as drilling apparatus 18, tamper device 185, or other devices that may be used in connection with drilling and backfill system 10. The high pressure line preferably delivers between 5.8 and 6 gallons per minute of hydraulic fluid at a pressure of 2000 lbs/in$^2$. Hydraulic return line 186 connects to a quick disconnect coupling 184 (FIGS. 1 and 2) on trailer 24. Intermediate quick disconnect coupling 184 and hydraulic fluid reservoir 174 is a filter 188 that filters the hydraulic fluid before returning it to hydraulic reservoir 174. While quick disconnect couplings 182 and 184 are shown on the side of trailer 24, it should be understood that the couplings may also be mounted on the rear of trailer 24.

Figure 2:
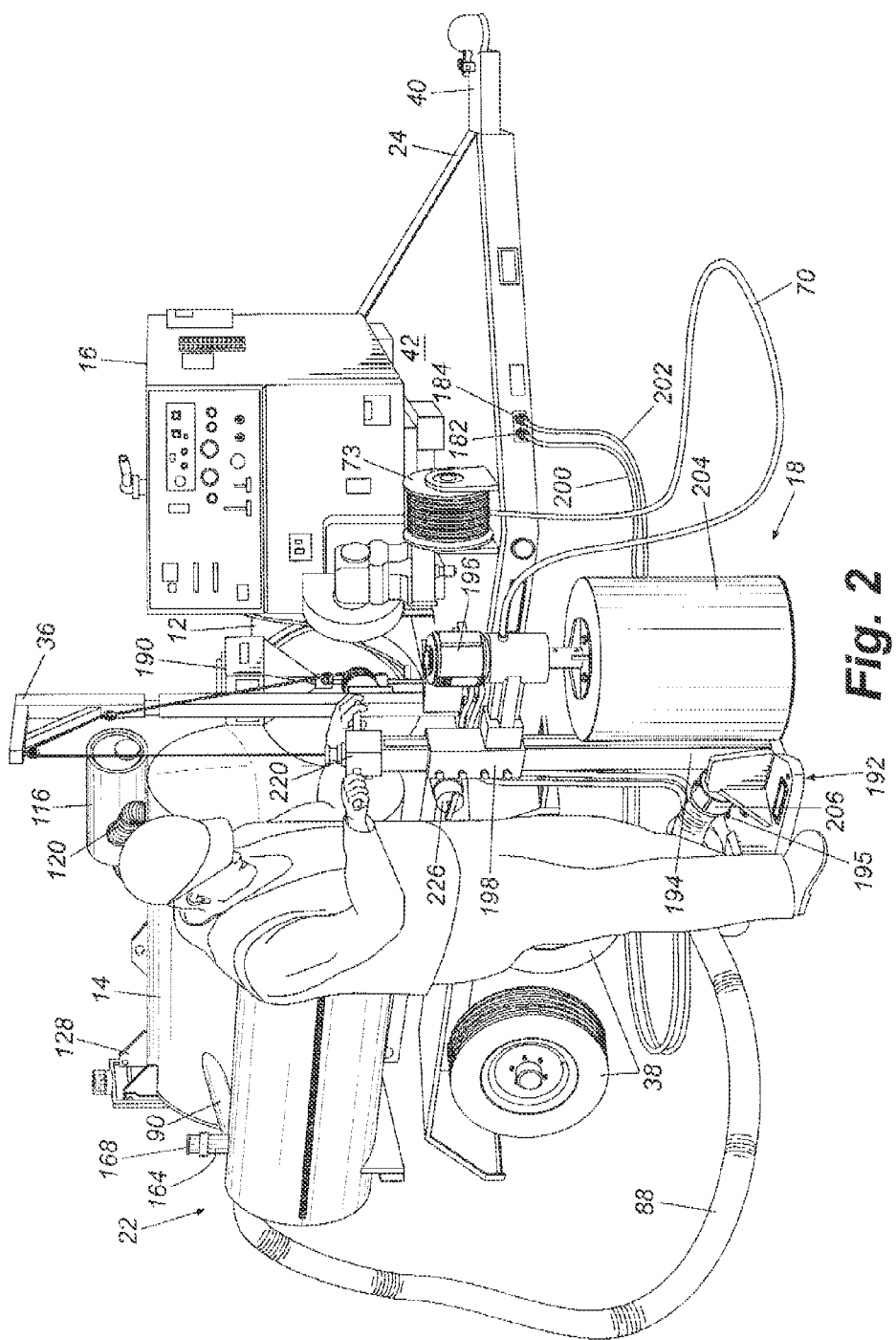
FIG. 2 is a perspective view of a prior art key hole drill for use with the drilling and backfill system of FIG. 1.

Referring to FIGS. 1 and 2, drilling apparatus 18 is carried on trailer 24 and is positioned using winch and crane 36. Drilling apparatus 18 includes a base 192, a vertical body 194, and a hydraulic drill motor 196 slidably coupled to vertical body 194 by a bracket 198. A high pressure hose 200 and a return hose 202 power motor 196. A saw blade 204 attaches to an output shaft of hydraulic motor 196 and is used to drill a coupon 206 (FIGS. 11 and 12) in pavement, concrete or other hard surfaces to expose the ground above the buried utility. The term coupon as used herein refers to a shaped material cut from a continuous surface to expose the ground beneath the material. For example, as illustrated in FIG. 11, coupon 206 is a circular piece of concrete that is cut out of a sidewalk to expose the ground thereunder.

Body 194 has a handle 220 for the user to grab and hold onto during the drilling process. Hydraulic fluid hoses 200 and 202 connect to two connectors 222 and 224 (FIG. 21) mounted on body 194 and provide hydraulic fluid to hydraulic drill motor 196. A crank 226 is used to move the drill motor vertically along body 194. Drilling apparatus 18 is a Model CD616 Hydra Core Drill manufactured by Reimann & Georger of Buffalo, N.Y. and is referred to herein as a "core drill."

In operation, the location of a hole is determined, and if drill apparatus 18 (FIG. 2) was used to remove a coupon from the site, the user disconnects vacuum hose 88 from the drill and connects the hose to digging tool handle 78 using banjo connector 84. High pressure water hose 70 is also connected to valve 74 to provide water to the digging tool as deemed necessary. As tool 32 is used to dig a hole, it is pressed downwardly into the ground. For larger diameter holes, digging tool 32 is moved in a generally circular manner as it is pressed downward thereby removing material from a large cross-section area. Slurry formed in the hole is vacuumed by tool 32 through vacuum passage 86 (FIGS. 4 and 5) and accumulates in collection tank 26. Once the hole is completed and the utility exposed, the vacuum system can be shut down, and the operators may examine or repair the utility as needed.

Figures 12, 13:
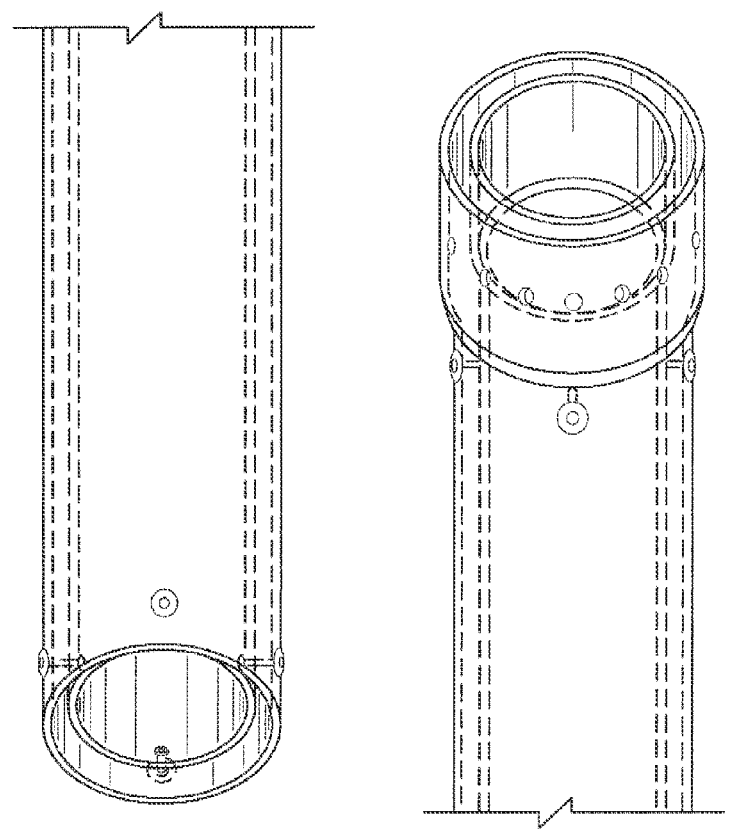
FIG. 12 is a perspective view of an earth reduction tool in accordance with an embodiment of the present invention in operation.
FIG. 13 is a bottom partial perspective view of the earth reduction tool shown in FIG. 12.
Figures 14, 15:
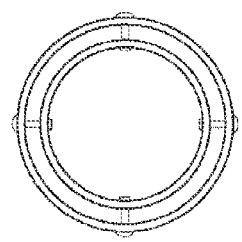
FIG. 14 is a top partial perspective view of the earth reduction tool of FIG. 12.
FIG. 15 is a bottom plan view of the earth reduction tool of FIG. 12.
Figure 16:
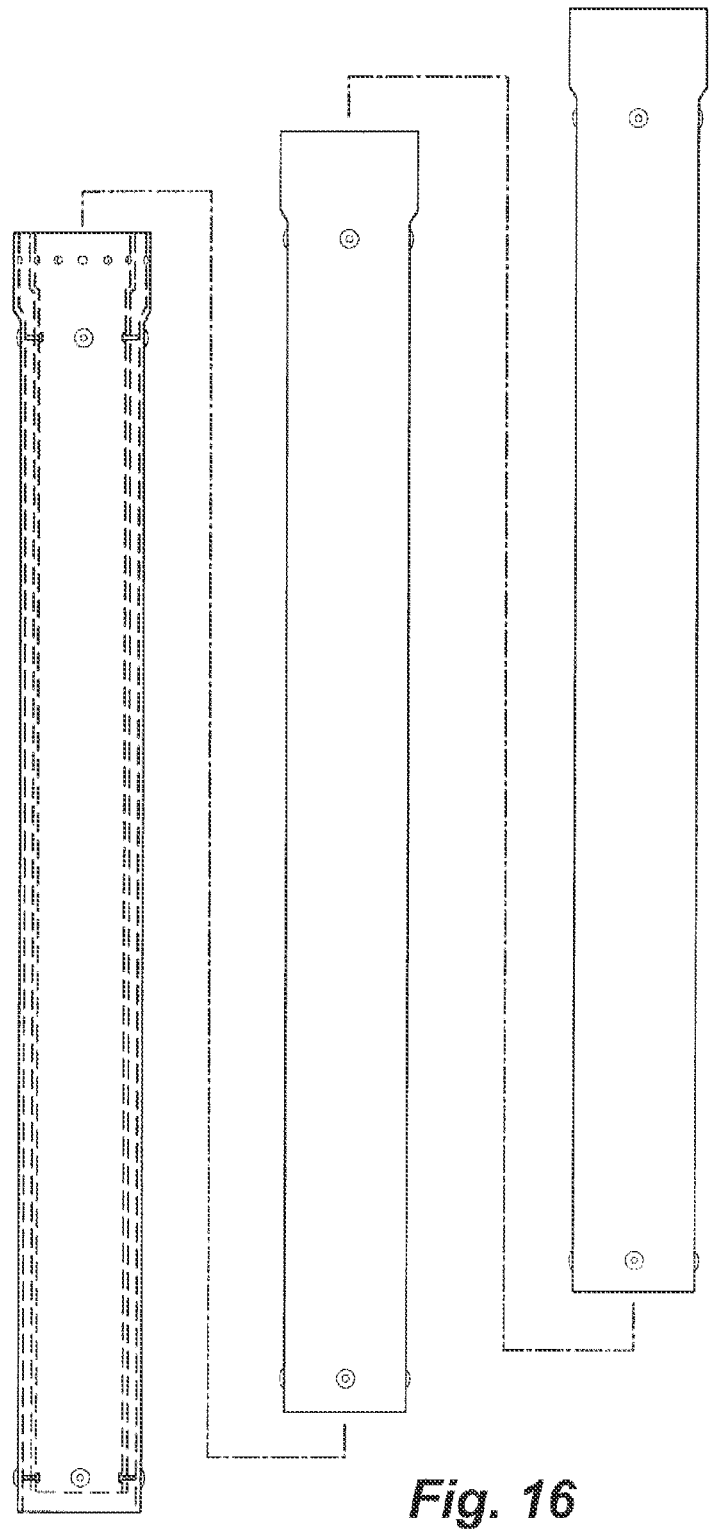
FIG. 16 is a top plan view of the earth reduction tool of FIGS. 11 and 12 shown with additional extensions.
Figure 18:
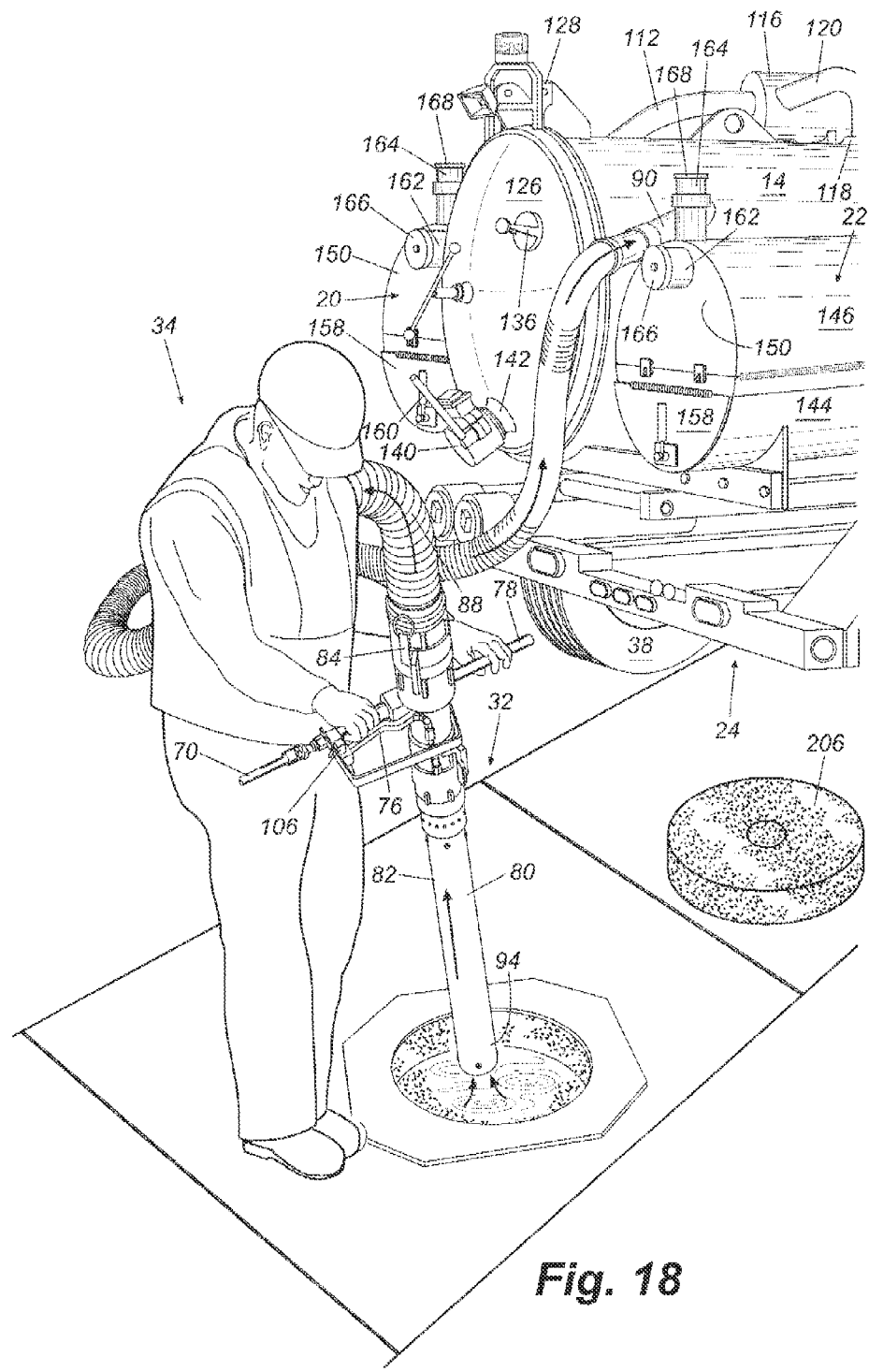
FIG. 18 is a perspective view of the earth reduction tool of FIG. 12 in use digging a hole.

Alternatively, referring to FIGS. 12 and 18, elongated body second end 316 may be inserted into the area where a hole is desired. Referring to FIG. 18, as a vacuum stream is pulled up vacuum passage 328, an air current 330 is pulled through gap 322, which is fed through holes 326. The air pulled into vacuum passage 328 from gap 322 allows the vacuum system to remove dirt and/or water more efficient and effectively than a tool without the additional air flow. Moreover, the placement of air inlet holes 326 distal from the vacuum end ensures that the air stream does not become clogged or blocked. It should also be understood that the embodiment shown in FIGS. 12-18 may be combined with a water feed line (not shown) and high pressure nozzles (not shown) to deliver high pressure water to body end 316.

After work on the utility is completed, and referring to FIG. 19, the operator may cover the utility with clean backfill from backfill reservoirs 20 and 22. In particular, trailer 24 is positioned so that one of backfill reservoirs 20 or 22 is proximate the hole. Hydraulic cylinders 130 are activated, causing the tanks to tip rearward so that backfill can be delivered through door 158 into the hole. Once the hole is sufficiently filled, hydraulic cylinders 130 return reservoirs 20 and 22 to their horizontal position, and door 158 is secured in the closed position.

Figure 20:
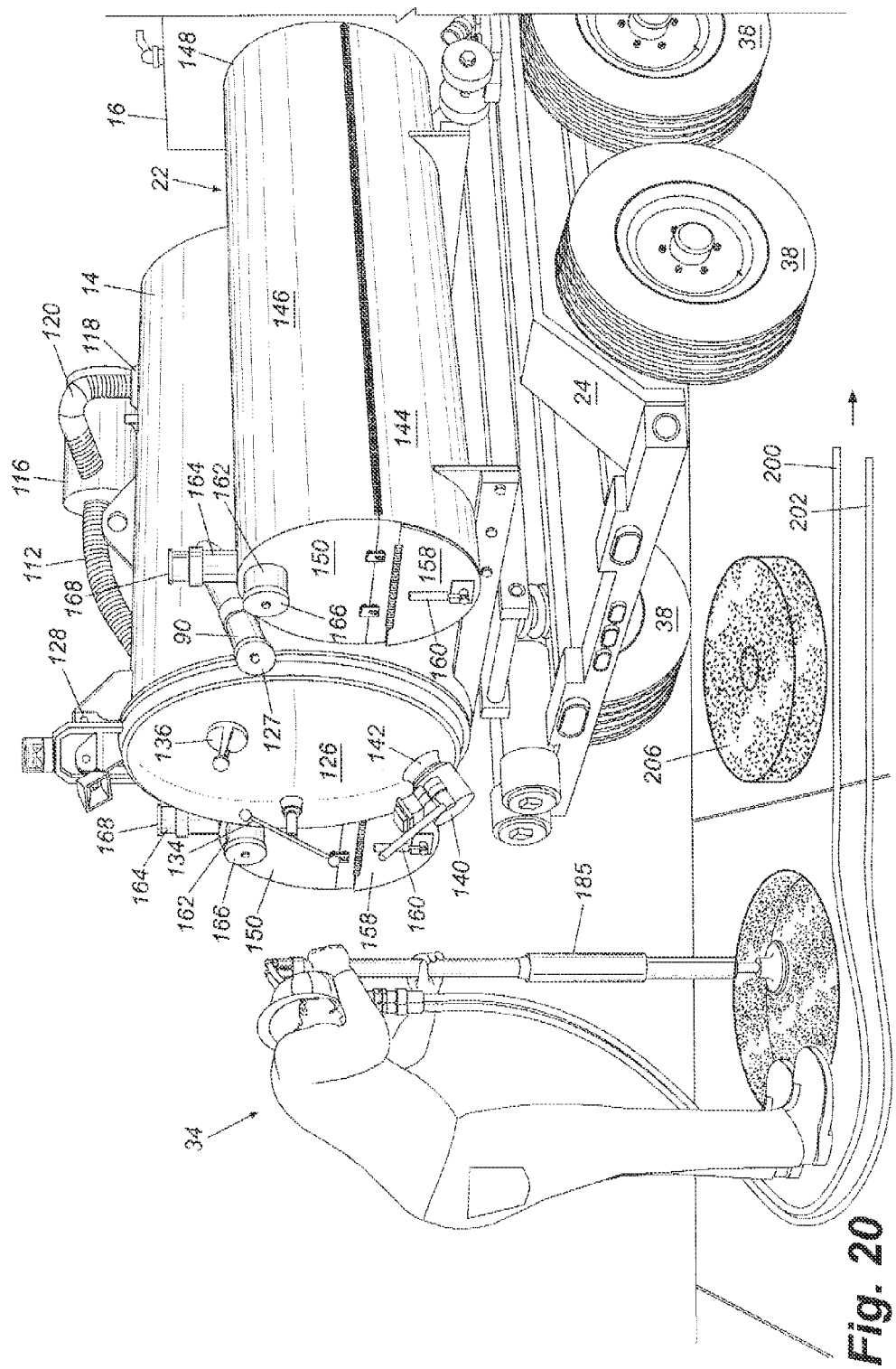
FIG. 20 is a perspective view of the drilling and backfill system of FIG. 1, showing the hole being tamped.

With reference to FIG. 20, operator 34 may use a tamping device 185 to tamp the backfill in the hole. Tamping device 185 connects to hydraulic pump 172 through quick disconnect couplings 182 and 184 via hydraulic lines 200 and 202. Tamping device 185 is used to pack the backfill in the hole and to remove any air pockets. Once the hole has been filed and properly packed, coupon 206 is moved into the remaining portion of the hole. The reuse of coupon 206 eliminates the need to cover the hole with new concrete. Instead, coupon 206 is placed in the hole, and grout is used to seal any cracks between the key and the surrounding concrete. Thus, the overall cost and time of repairing the concrete is significantly reduced, and the need for new concrete is effectively eliminated.

Drilling and backfill system 10 can be used to dig multiple holes before having to empty collection tank 14. However, once collection tank 14 is full, it can be emptied at an appropriate dump site. In emptying collection tank 14, motor 16 is idled to maintain a vacuum in tank 14. This allows the door handle to be turned so that the female threaded member (not shown) is no longer in threading engagement with the male member (not shown) on nozzle rod 132, while the vacuum pressure continuing to hold the door closed. Once motor 16 is shut down, the vacuum pressure is released so that air enters the tank, thereby pressurizing the tank and allowing the door to be opened. Once opened, hydraulic cylinders 130 can be activated to raise forward end 132 upward dumping the slurry from the tank.

Collection tank 14 may also include a vacuum switch and relay (not shown) that prevents the tank from being raised for dumping until the vacuum in the tank has dropped below a predetermined level for door 126 to be opened. Once the vacuum in the tank has diminished to below the predetermined level, tank 14 may be elevated for dumping. This prevents slurry from being pushed up into filter 116 if door 126 can not open.

In an alternate embodiment shown in FIGS. 22-27, collection tank 14 is equipped with a sealing flange 415, a discharge door 426 connected to the main tank body by a hinge 428, and an automatic discharge door closer 400. Automated discharge door closer 400 has two linkage assemblies 430A (FIGS. 22 and 24) and 430B (FIGS. 23 and 25), each including an upper linkage arm, a lower linkage arm, and an actuating cylinder. For ease of discussion, reference will be made to FIGS. 22, 24, 26 and 27 to describe linkage assembly 430A, where all reference numbers are annotated with a capital "A." However, it should be understood that the same components exist for linkage assembly 430B shown in FIGS. 23 and 25. Any differences between the linkage assemblies will be pointed out.

Figure 23:
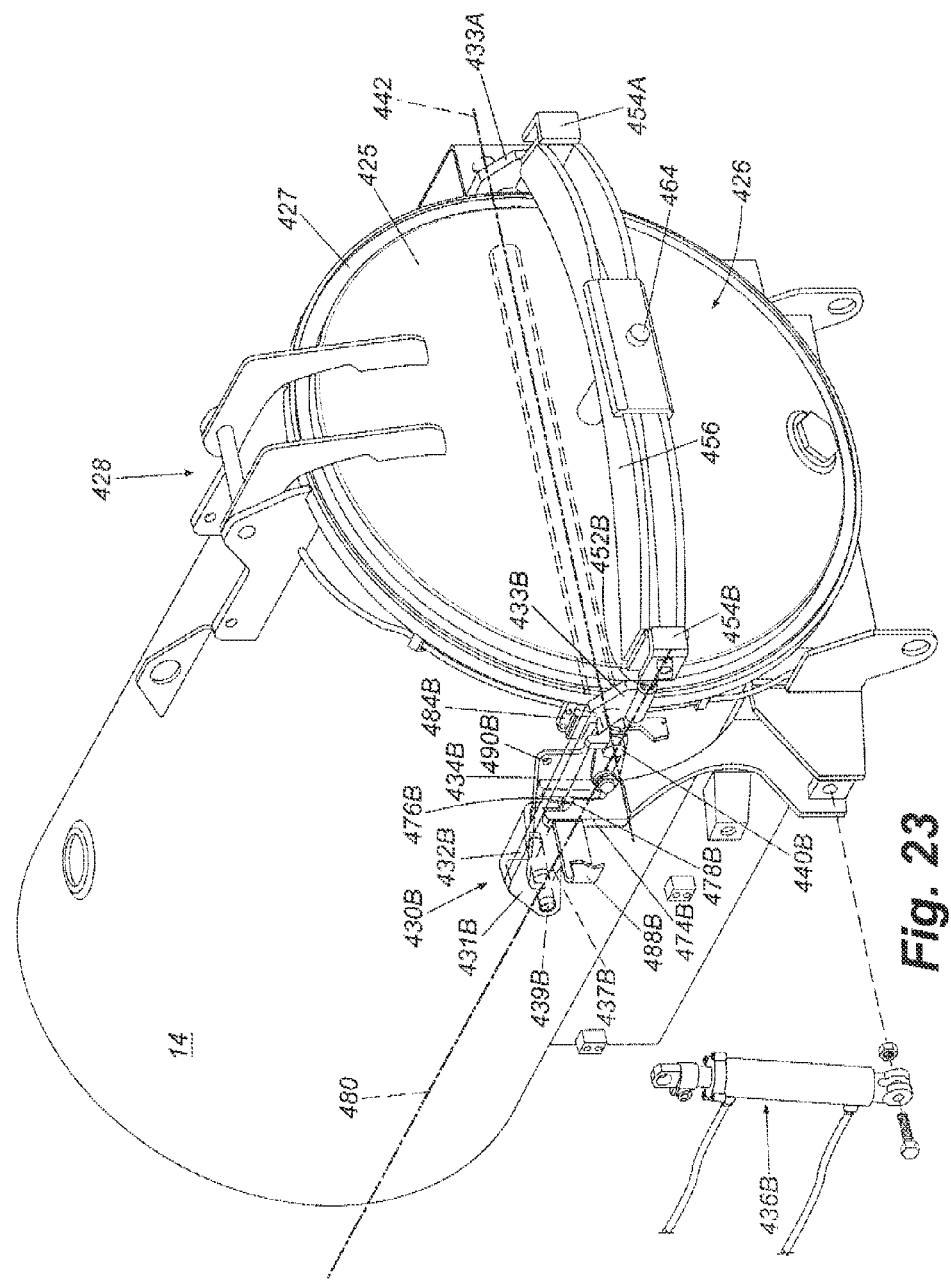
FIG. 23 is a right side partial exploded perspective view of the tank of FIG. 22.
Figure 24:
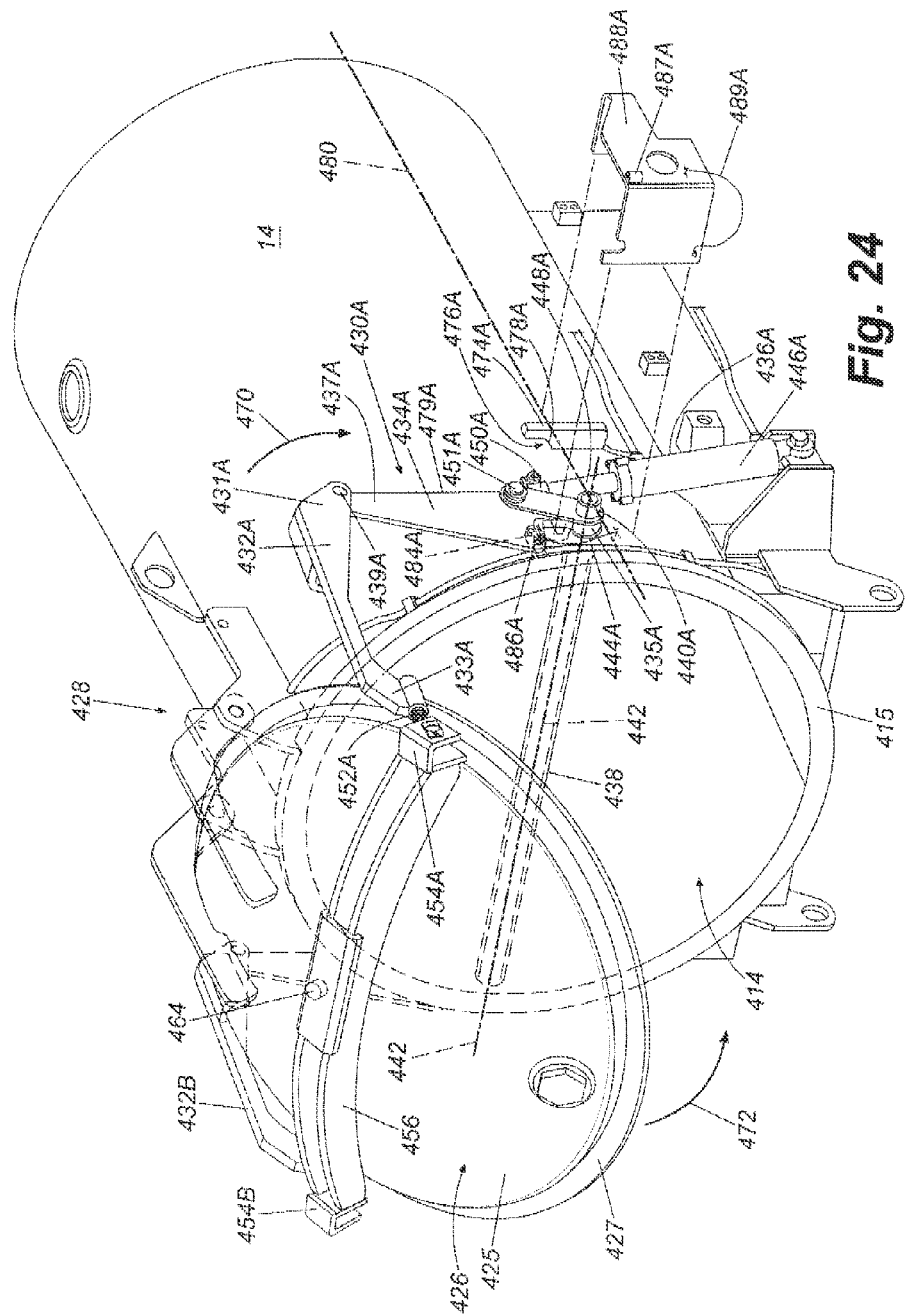
FIG. 24 is a left side partial exploded perspective view of the tank of FIG. 22.
Figure 25:
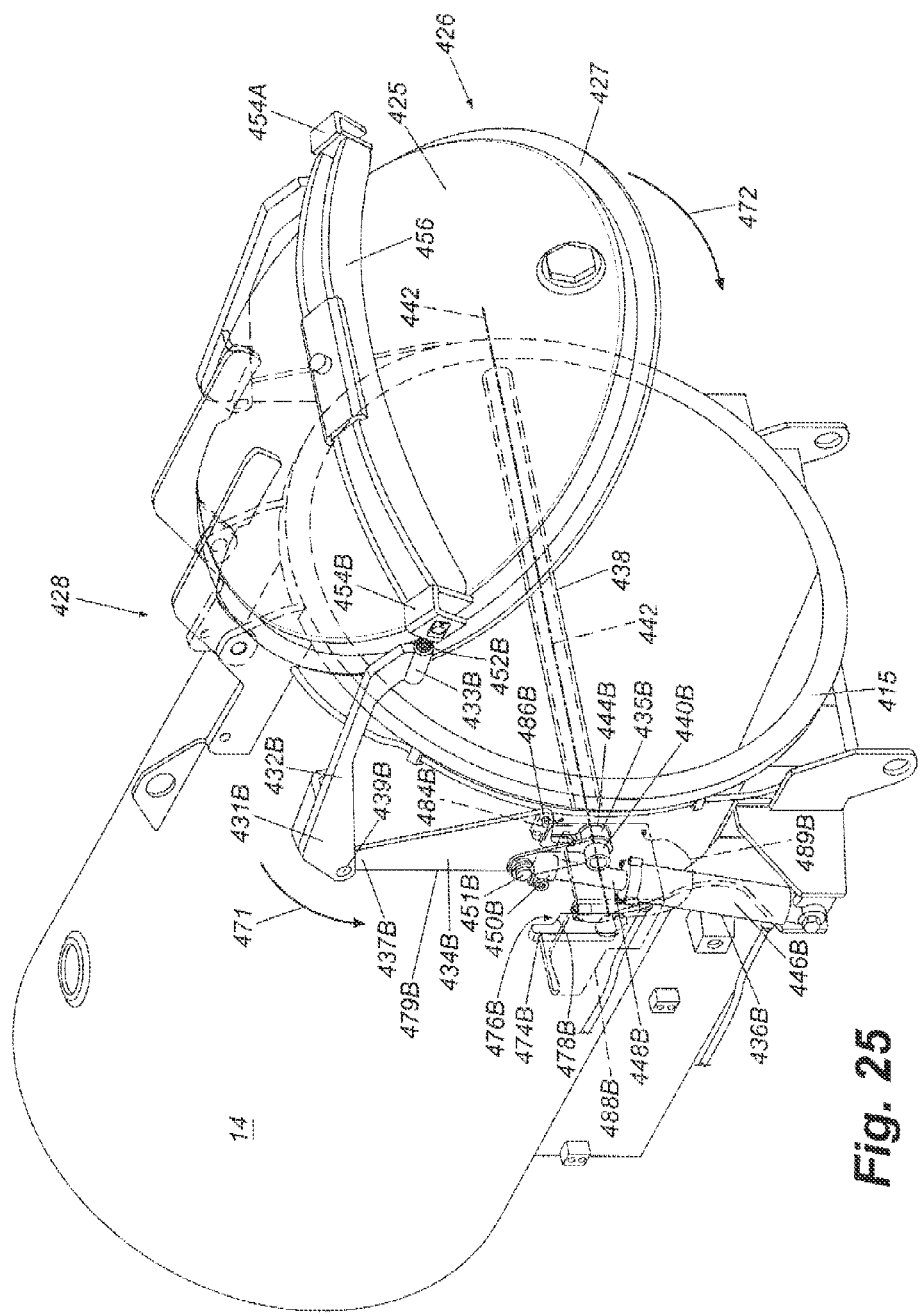
FIG. 25 is a right side perspective view of the tank of FIG. 22, shown in the open position.

Referring to FIG. 24, a lower linkage arm 434A has a lower edge 479A and a first end 435A rigidly connected to a linkage assembly pivot bar 438 at the pivot bar's first end 440A. Pivot bar 438 extends from its first end 440A through the outer wall of collection tank 14 and into an internal chamber 414. The pivot bar has a longitudinal axis 442 oriented generally parallel to a diameter of the collection tank 14. The pivot bar extends along its axis 442 through the tank internal chamber 414 and further extends through the opposite side of the collection tank outer wall and terminates at a pivot bar second end 440B (FIGS. 23 and 25). In one preferred embodiment, a sealed bearing 444A rotatably engages pivot bar 438 at the point where the pivot bar passes through the collection tank external wall to ensure that tank internal chamber 414 remains sealed from the outside atmosphere. The rigid connection of lower linkage arm first ends 435A (FIG. 24) and 435B (FIG. 25) with respective first and second pivot bar ends 440A (FIG. 24) and 440B (FIG. 25) entrains both of the lower linkage arms with the pivot bar so that the lower linkage arms rotate in unison with the pivot bar.

First lower linkage arm 434A has a second end 437A and an actuating cylinder mounting hole (not shown) intermediate its first and second ends. In one preferred embodiment, actuating cylinder 436A is a hydraulic cylinder having a cylinder housing 446A and a piston rod 448A that is slidably received in housing 446A. Piston rod 448A has a free end 450A that is adapted for pivotal attachment to the lower linkage arm cylinder mounting hole. Preferably, a pin connection 451A pivotally attaches piston rod free end 450A to the cylinder mounting hole (not shown) by a clevis, eyebolt or other similar pivotal linkage.

A pivot pin 439A pivotally connects first lower linkage arm second end 437A with a first end 431A of an upper linkage arm 432A. Upper linkage arm 432A has a second end 433A that adjustably receives a threaded portion of an eye bolt 452A. Eye bolt 452A has an eye (not shown) that is pivotally connected to a first end 454A of a cross bar 456. Thus, the threaded connection between upper linkage arm second end 433A and cross bar first end 454A allows for adjustment of the space between the upper linkage arm second end and the cross bar first end.

Figure 22:
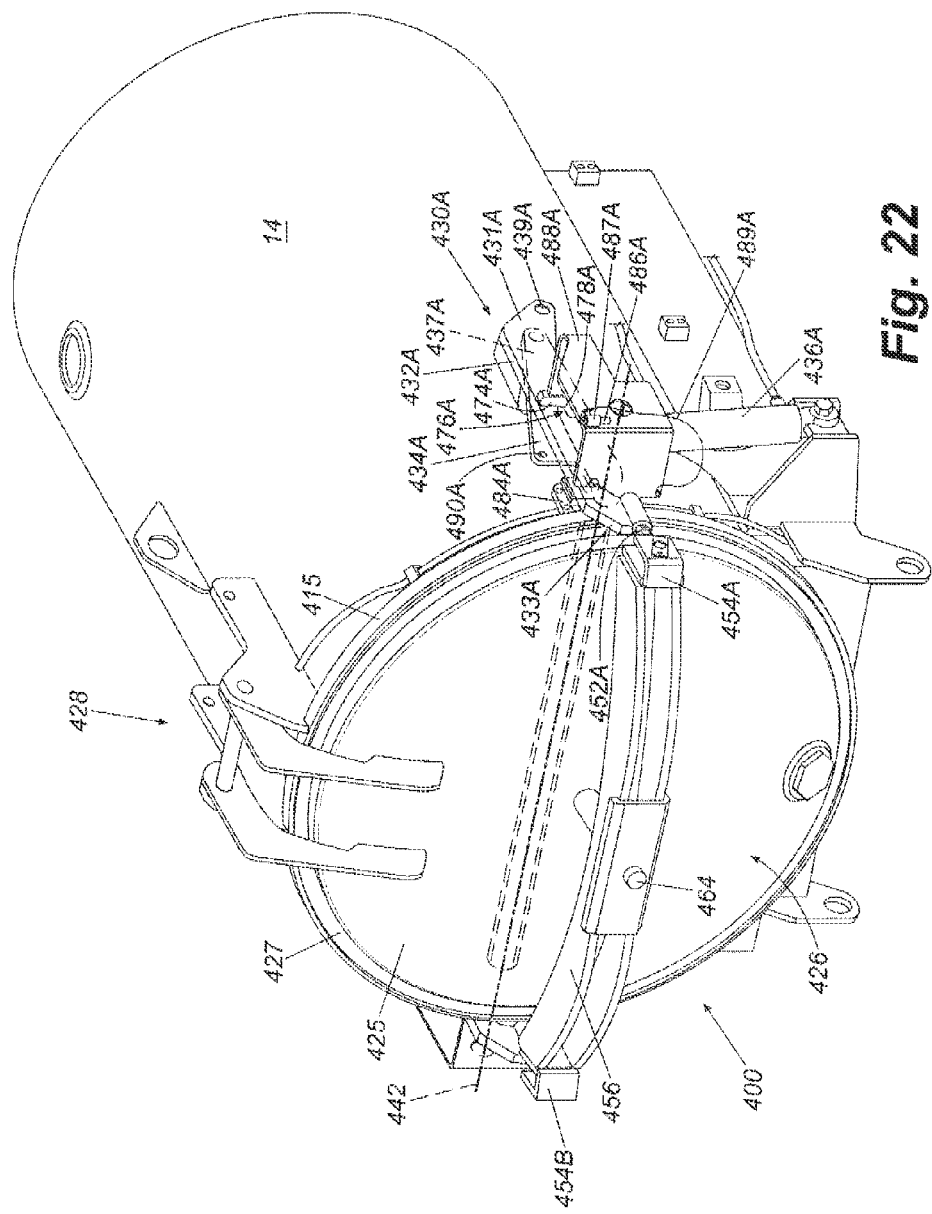
FIG. 22 is a left side perspective view of a tank in accordance with an embodiment of the present invention in operation.
Figure 26:
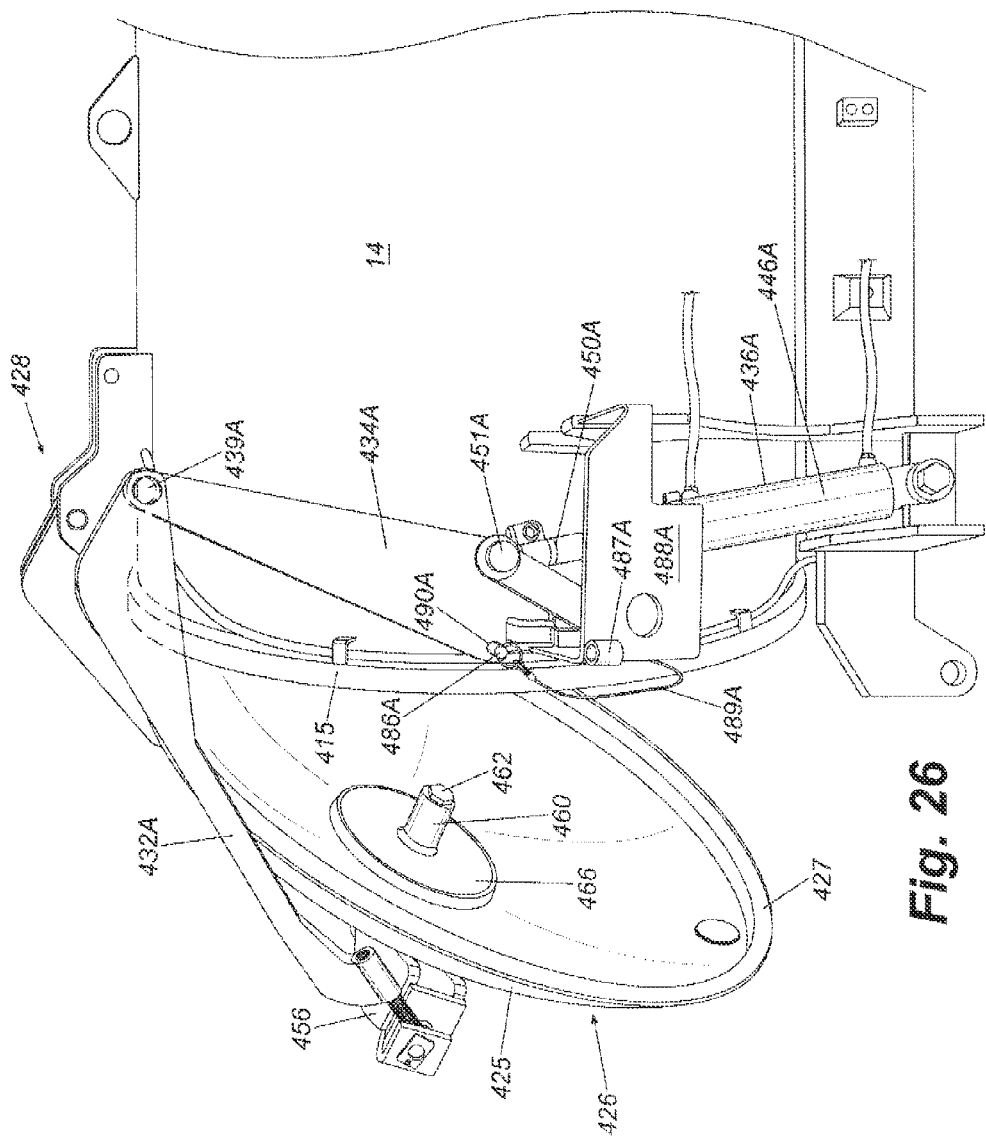
FIG. 26 is a left side partial perspective view of the tank of FIG. 22, shown in the open position.

Referring to FIG. 26, cross bar 456 is rigidly mounted to discharge door 426 by means of an attachment cylinder 460. Door 426 has a door panel 425 that is preferably domeshaped, and attachment cylinder 460 is located on the interior surface of discharge door panel 425 directly opposite the center or origin of the exterior surface of the door panel. As described in further detail below, the location of attachment cylinder 460 at the center (origin) of the door panel helps maximize the strength of the seal when the discharge door if fully closed. In one preferred embodiment, attachment cylinder 460 receives a bolt 462 that passes through both the attachment cylinder and dome-shaped door panel 425 and is securely fastened to cross bar 456 by a nut 464 (FIG. 22). A secondary disk 466 reinforces the connection between the attachment cylinder 460 and door 426 to prevent the domeshaped discharge door panel 425 from dimpling or deforming when door 426 is sealed against collection tank sealing flange 415. It should be understood that door panel 425 may be flat, concave or convex as shown in the figures and the shape is based on the application of the door.

Referring to FIG. 24, collection tank 14 is depicted with discharge door 426 in a fully opened position. Automated linkage assembly 430A and 430B (FIG. 25) and pivot bar 438 cooperate with hinge 428 to rotate discharge door 426 into and out of sealing engagement with collection tank flange 415. When closing the discharge door from its fully open position, actuating cylinder 436A retracts piston rod 448A. The pivotal pin connection 451A between piston rod free end 450A and lower actuating arm 434A forces lower actuating arm 434A and therefore pivot bar 438 to pivot so that lower actuating arm second end 437A rotates in the direction of arrow 470.

Referring to FIG. 25, the rigid connection between the second lower actuating arm first end 435B and pivot bar second end 440B forces second lower actuating arm 434B to rotate in the direction of arrow 471 in response to the retraction of actuating cylinder 436A (FIG. 24). Additionally, an actuating cylinder 436B, connected similar to actuating cylinder 436A, may simultaneously retract a piston rod 448B as actuating cylinder 436A retracts its piston rod, resulting in increased closing force applied to lower actuating arms 434A and 434B and pivot bar 438. Actuating cylinders 436A and 436B represent a system redundancy because the actuation of either actuation cylinder forces both lower actuating arms to rotate due to their rigid attachment to pivot bar 438. Accordingly, one of the actuating cylinders may be omitted without altering the function of the automated door. Moreover, should one of the actuating cylinders fail during operation, the other can operate the opening and closing of the door so as to maintain the functional integrity of the system. It should be understood that the lower actuating arms do not necessarily need to be rigidly attached to pivot bar 438 but instead may be rotatable with respect to the pivot bar. Thus, in this configuration, each actuating cylinder would drive its respective lower actuating arm.

In operation and referring to FIGS. 24 and 25, as the lower actuating arms rotate in response to the retraction of one or more of the cylinder piston rods, first and second lower actuating arm second ends 437A and 437B exert a downward force on upper actuating arm first ends 431A and 431B, through pivot pins 439A and 439B. The downward force applied on upper actuating arm first ends 431A and 431B pulls the upper actuating arms downward and away from the collection tank open end causing upper actuating arm second ends 433A and 433B to pull cross bar 456 downward in the direction of arrow 472. As the cross bar travels in the direction of arrow 472, the rigid connection between cross bar 456 and discharge door 426 forces door hinge 428 to pivot the door into closing engagement with collection tank sealing flange 415. Discharge door 426 has a flange 427 about its outer periphery that forms a sealed engagement with collection tank flange 415 once the discharge door fully closes. It should be understood that a gasket (not shown) may be attached to one of tank flange 415 or door flange 427 to assist in forming an airtight seal when the door in the closed position.

Figure 27:
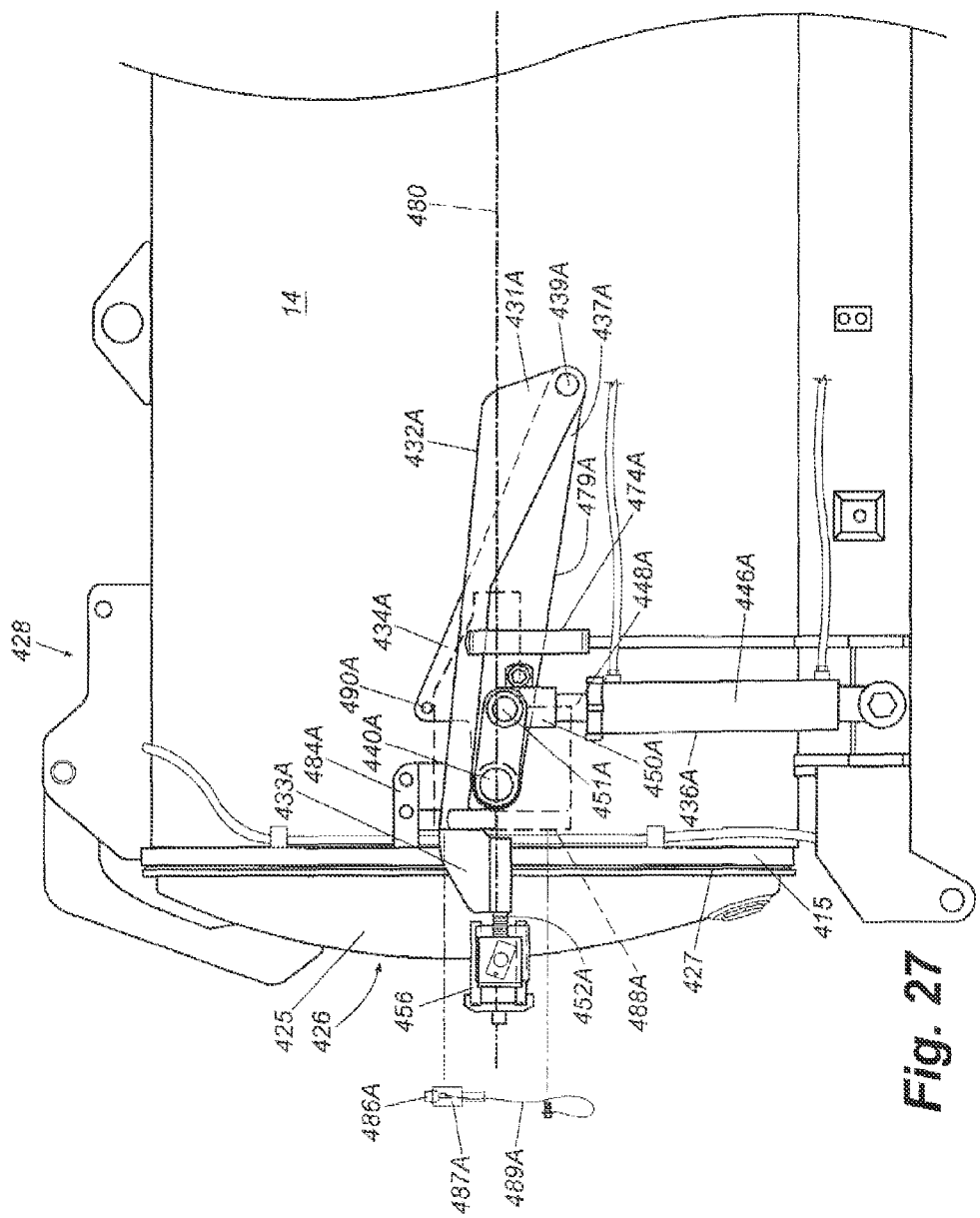
FIG. 27 is a left side elevation view of the tank of FIG. 22, shown in the closed position.

Referring to FIG. 27, once discharge door flange 427 seals with tank flange 415, actuating cylinder 436A continues to retract piston rods 448A. As the piston rod further retracts, lower actuating arm second end 437A enters into its respective seating bracket 474A and. Seating bracket 474A has a recess 476A with a bottom seat surface 478A. When the lower actuating arm has rotated sufficiently to bring its lower edge 479A into contact with seat surface 478A, the contact between the actuating arm lower edges and the seat surface prevents further rotation of the lower actuating arms. The same holds true for linkage assembly 430B on the opposite side of tank 14.

Seating bracket 476A is preferably positioned such that lower actuating arm lower edge 479A contact seat surface 478A only when pivot point 439A is located at a position below a horizontal line 480 that intersects the pivot bar longitudinal axis 442. This condition is commonly referred to as "rotation beyond overcenter," and FIG. 27 shows automated linkage assembly 430A when placed in this position. Because of the entrained movement of both automated linkage assembly 430A and automated linkage assembly 430B, both linkage assemblies respond identically as they rotate beyond overcenter. In this position, door 26 is biased in the closed position and will remain in the closed position should actuating cylinders 446A and 446B fail. That is, because pivot points 439A and 439B are rotated beyond overcenter, lower actuating arms 434A and 434B cannot rotate in a direction opposite arrows 470 (FIG. 24) and 471 (FIG. 25) unless they are actively biased in those directions to a point above line 480. As a result, in this position, the door is considered biased into the closed position since an active force must bias the lower actuating arm pin connections back overcenter into the open position.

When opening door 426 from its closed position, actuating cylinder 436A extends piston rod 448A upward causing pivot point 439A to rotate in a direction opposite to arrow 470 above center line 480. This rotation cause upper actuating arm 432A to move rearward toward the tank open end causing door 426 to pivot upward on hinge 428. As lower actuating arm 434A rotates, pivot bar 438 also rotates causing linkage assembly 430B to move similar to that of linkage 430A. Additionally, actuating cylinder 436B (FIG. 25) may simultaneously extend piston rod 448B as actuating cylinder 436A extends its piston rod 448A, resulting in an increased opening force applied to lower actuating arms 434A and 434B. Thus, as the lower actuating arms rotate in the opening direction, the upper actuating arms urge cross bar 456, and therefore door 426, to travel opposite the direction indicated by arrow 472 (FIG. 25).

Referring to FIGS. 24 and 25, once door 426 is in the fully open position, an operator may lock lower actuating arms 434A and 434B in the open position. Preferably, two bearing brackets 484A and 484B mounted to the external surface of tank 14 each have a locking pin hole (not shown) sized appropriately to receive an end of a respective locking pin 486A and 486B. Additionally, the lower actuating arms each have a corresponding locking pin hole 490A and 490B (FIGS. 22 and 23) also sized appropriately to receive locking pins 486A and 486B. Thus, when the actuating cylinders rotate the lower actuating arms into their fully open position, lower actuating arm locking pin holes 490A and 490B align with the bearing bracket locking pin holes (not shown), and the operator may insert locking pins 486A and 486B through the two aligned holes. In this way, locking pins 486A and 486B secure the lower actuating arms in the fully open position ensuring that door 26 remains open when tank 14 is being cleaned.

Referring to FIGS. 25 and 26, locking pins 486A and 486B are tethered to a safety guard 488A and 488B by a lanyard 489A and 489B so that the operator will not misplace the locking pins. Safety guards 488A and 488B perform the dual function of protecting the operator from pinch points created by the articulating automated linkage assemblies 430A and 430B and providing a storage hole 487A and 487B to receive the locking pins when not in use.

As previously stated, the above discussion was directed primarily to linkage assembly 430A. However, one of skill in the art should understand that the discussion holds equally for linkage assembly 430B. Moreover, while not shown in the figures, one of skill in the art should understand that automated linkage assemblies 430A and 430B may be operated by a control panel at the back of the vehicle, at a control panel located inside the vehicle or remotely by a wireless or wired control panel. One or more of these control panels may be provide to operate the automated assembly.

The above described embodiments of the automated door closer provide several advantages. First, rotating the lower actuating arm 434A and 434B into the "beyond overcenter" condition maximizes the amount of sealing force exerted by cross bar 456 upon discharge door 426. Second, placing the lower actuating arms in the "beyond overcenter" condition ensures that the door is maintained in the closed position. However, the contact between lower actuating arm lower edges 479A and 479B and seating bracket seat surfaces 478A and 478B prevents further rotation in the direction of arrows 470A and 470B. This arrangement presents a significant safety advantage.

Another significant advantage of the automated door closer is the fact that it provides an even seal around the entire circumference of the discharge door. The location of the contact between cross bar 456 and discharge door 426 at the center of the door panel allows an evenly distributed force to be applied between the door flange and the tank flange ensuring a tight seal. That is, the location of attachment cylinder 460 ensures that all compressive closing force applied to the door will be located at the center of the door 426. In this way, the compressive force is transferred uniformly out to the outer circumference of door 426. In prior art designs, the closing force is usually applied to one or two opposite points on the door periphery. In such designs, while the closing force ensures a tight seal proximate the connection points, it fails to ensure a tight seal around the entire periphery of the door.

It should be appreciated by those skilled in the art that various modifications and variations can be made in the present invention without departing from the scope and spirit of the invention. It is intended that the present invention cover such modifications and variations as come within the scope and spirit of the appended claims and their equivalents.

What is claimed is:

1. A collection tank for use in a vacuum operated earth reduction system, said collection tank comprising:
 a. a closed first end;
 b. an open second end;
 c. a generally cylindrical body extending between the closed first end and the open second end;
 d. a door pivotally coupled to the body so that the door is movable between a first position, at which the door is spaced from the open second end, and a second position, at which the door closes the open second end; and
 e. a door closer having
   (i) a cross bar rigidly attached to the door, the cross bar having a first end and a second end,
   (ii) a first linkage assembly having a first end coupled to the cross bar first end at a first pivot point, a second end coupled to the body at a second pivot point, and a third pivot point intermediate the first linkage assembly first pivot point and the first linkage assembly second pivot point, and (iii) a second linkage assembly having a first end coupled to the cross bar second end at a first pivot point, a second end coupled to the body at a second pivot point, and a third pivot point intermediate the second linkage assembly first pivot point and the second linkage assembly second pivot point, wherein the first linkage assembly and the second linkage assembly are configured so that when the door is in the second position, a first line passes through the first linkage assembly first pivot point and the first linkage assembly second pivot point, and a second line passes through the second linkage assembly first pivot point and the second linkage assembly second pivot point, and when the first linkage assembly third pivot point has rotated from a first side of the first line to a second side of the first line and the second linkage assembly third pivot point has rotated from a first side of the second line to a second side of the second line, the first linkage assembly third pivot point is biased away from the first line, the second linkage assembly third pivot point is biased away from the second line, and the first linkage assembly and the second linkage assembly provide respective closing forces to the cross bar in a direction toward the door.

2. The collection tank of claim 1, the door closer further comprising a shaft defining a first end connected to the first linkage assembly second end and a second end connected to the second linkage assembly second end.

3. The collection tank of claim 2, the door closer further comprising at least one hydraulic cylinder having a piston rod in driving engagement with one of the first and second linkage assemblies, the at least one hydraulic cylinder configured to move the door between the first position and the second position.

4. The collection tank of claim 1, wherein the door has a generally circular-shaped periphery.

5. The collection tank of claim 4, wherein the door has a generally circular-shaped door panel that is dome-shaped.

6. The collection tank of claim 1, wherein the first linkage assembly is coupled to the second linkage assembly so that the first and the second linkage assemblies move together.

7. The collection tank of claim 1, comprising a connection between the cross bar and the door that is configured so that the connection applies, in response to the closing forces provided to the cross bar when the door is in the second position, a net force through a center of the door.

8. The collection tank of claim 4, comprising a connection between the cross bar and the door having a generally circular periphery that is concentric with the generally circular periphery of the door about a center of the door.

9. The collection tank of claim 1, wherein the collection tank comprises a stop proximate one of the first linkage assembly and the second linkage assembly that limits movement of the third pivot point on the second side of the corresponding first line or second line in a direction away therefrom.

10. The collection tank of claim 1, wherein the first linkage assembly comprises a first arm that includes the first linkage assembly first end, and a second arm that includes the first linkage assembly second end, wherein the first linkage assembly first arm and the first linkage assembly second arm are coupled to each other at the first linkage assembly third pivot point, and the second linkage assembly comprises a first arm that includes the second linkage assembly first end, and a second arm that includes the second linkage assembly second end, wherein the second linkage assembly first arm and the second linkage assembly second arm are coupled to each other at the second linkage assembly third pivot point, and the collection tank comprises a shaft extending entirely across an interior of the generally cylindrical body along an axis passing through the first linkage assembly second pivot point and the second linkage assembly second pivot point.

11. The collection tank of claim 10, wherein the shaft defines a first end connected to the first linkage assembly second end and a second end connected to the second linkage assembly second end.

12. The collection tank of claim 10, the door closer further comprising at least one hydraulic cylinder having a piston rod in driving engagement with one of the first and second linkage assemblies, the at least one hydraulic cylinder configured to move the door between the first position and the second position.

13. The collection tank of claim 10, wherein the door has a generally circular-shaped periphery.

14. The collection tank of claim 10, comprising a connection between the cross bar and the door that is configured so that the connection applies, in response to closing forces applied to the cross bar when the door is in the second position, a net force through a center of the door.

15. The collection tank of claim 10, comprising a connection between the cross bar and the door having a generally circular periphery that is concentric with the generally circular periphery of the door about a center of the door.

16. A mobile backfill system for collecting material, comprising:

a. a collection tank comprising a body having
   a closed first end,
   an open second end defining a tank sealing flange,
   a body extending between the closed first end and the open second end,
   a door pivotally coupled to the body so that the door is movable between a first position, at which the door is spaced from the open second end, and a second position, at which the door engages the body at a periphery of the door and closes the open second end;

b. a vacuum pump connected to the collection tank that draws an air stream through the collection tank for carrying material into the collection tank; and c. a door closer having
   a cross bar rigidly attached to the door, the cross bar having a first end and a second end,
   a first linkage assembly comprising a first arm having a first end coupled to the cross bar first end at a first pivot point, and a second arm having a second end coupled to the body at a second pivot point, wherein the first linkage assembly first arm and the first linkage assembly second arm are coupled to each other at a third pivot point intermediate the first linkage assembly first pivot point and the first linkage assembly second pivot point, and
   a second linkage assembly comprising a first arm having a first end coupled to the cross bar second end at a first pivot point, and a second arm having a second end coupled to the body at a second pivot point, wherein the second linkage assembly first arm and the second linkage assembly second arm are coupled to each other at a third pivot point intermediate the second linkage assembly first pivot point and the second linkage assembly second pivot point, wherein the first linkage assembly and the second linkage assembly are configured so that when the door is in the second position, a first line passes through the first linkage assembly first pivot point and the first linkage assembly second pivot point, and a second line passes through the second linkage assembly first pivot point and the second linkage assembly second pivot point, and when the first linkage assembly third pivot point has rotated from a first side of the first line to a second side of the first line and the second linkage assembly third pivot point has rotated from a first side of the second line to a second side of the second line, the first linkage assembly third pivot point is biased away from the first line, and the first linkage assembly and the second linkage assembly provide respective closing forces to the cross bar.

17. The system of claim 16, comprising a shaft extending entirely across an interior of the body along an axis passing through the first linkage assembly second pivot point and the second linkage assembly second pivot point.

18. The system of claim 16, wherein the door has a generally circular-shaped periphery.

19. The system of claim 16, comprising a connection between the cross bar and the door that is configured so that the connection applies, in response to closing forces applied to the cross bar when the door is in the second position, a net force through a center of the door.

20. The system of claim 18, comprising a connection between the cross bar and the door having a generally circular periphery that is concentric with the generally circular periphery of the door about a center of the door.

21. The system of claim 16, wherein the collection tank comprises a stop proximate one of the first linkage assembly and the second linkage assembly that limits movement of the third pivot point on the second side of the corresponding first line or second line in a direction away therefrom.

* * * * *